US012675260B1

(12) United States Patent
Paliwal et al.

(10) Patent No.: US 12,675,260 B1
(45) Date of Patent: Jul. 7, 2026

(54) PERSONALIZATION TECHNIQUES FOR CODE GENERATION PLATFORMS

(71) Applicant: ExlService Holdings, Inc., New York, NY (US)

(72) Inventors: Shantanu Paliwal, Wood-Ridge, NJ (US); Nikhil Ahuja, Gurgaon (IN); Siddhartha Pradeep, Raipur (IN); Devyani Rastogi, Livingston, NJ (US)

(73) Assignee: ExlService Holdings, Inc., New York, NY (US)

( * ) Notice: Subject to any disclaimer, the term of this patent is extended or adjusted under 35 U.S.C. 154(b) by 0 days.

(21) Appl. No.: 19/389,462

(22) Filed: Nov. 14, 2025

(51) Int. Cl.
| | |
|---|---|
| *G06F 8/30* | (2018.01) |
| *G06F 16/3349* | (2025.01) |
| *G06F 16/335* | (2019.01) |
| *G06N 20/00* | (2019.01) |

(52) U.S. Cl.
CPC ............ *G06F 8/30* (2013.01); *G06F 16/3349* (2019.01); *G06F 16/335* (2019.01); *G06N 20/00* (2019.01)

(58) Field of Classification Search
CPC ...... G06F 8/30; G06F 16/335; G06F 16/3349; G06N 20/00
See application file for complete search history.

(56) References Cited

U.S. PATENT DOCUMENTS

| | | | | |
|---|---|---|---|---|
| 11,726,994 | B1 * | 8/2023 | Wang | ............... G06F 16/24573 707/769 |
| 2023/0041181 | A1 * | 2/2023 | Wang | .................. G06Q 30/015 |
| 2024/0061833 | A1 * | 2/2024 | Tangari | ................ G06F 16/243 |
| 2025/0086235 | A1 * | 3/2025 | Kumar | ............. G06F 16/90332 |
| 2025/0110977 | A1 * | 4/2025 | Krebs | ................ G06F 16/3349 |

* cited by examiner

*Primary Examiner* — Phillip H Nguyen
(74) *Attorney, Agent, or Firm* — Perkins Coie LLP

(57) ABSTRACT

Systems and methods are disclosed comprising techniques for personalization in code generation. A platform determines a user persona based on contextual information regarding a user associated with a natural language query. If a corresponding ontology entry is not found, wherein the code unit is identified based on the determined user persona, the platform applies an artificial intelligence model to generate a code unit by prompting the artificial intelligence model with the at least a portion of the natural language query and one or more of the user role information, the historical interaction pattern information, or the determined user persona. The generated code unit is executed against a data source to generate a result set. Responsive to detecting a feedback item in connection with the result set or the code unit, the platform enables incremental training of the artificial intelligence model. Code units can be modified based on additional feedback items.

20 Claims, 9 Drawing Sheets

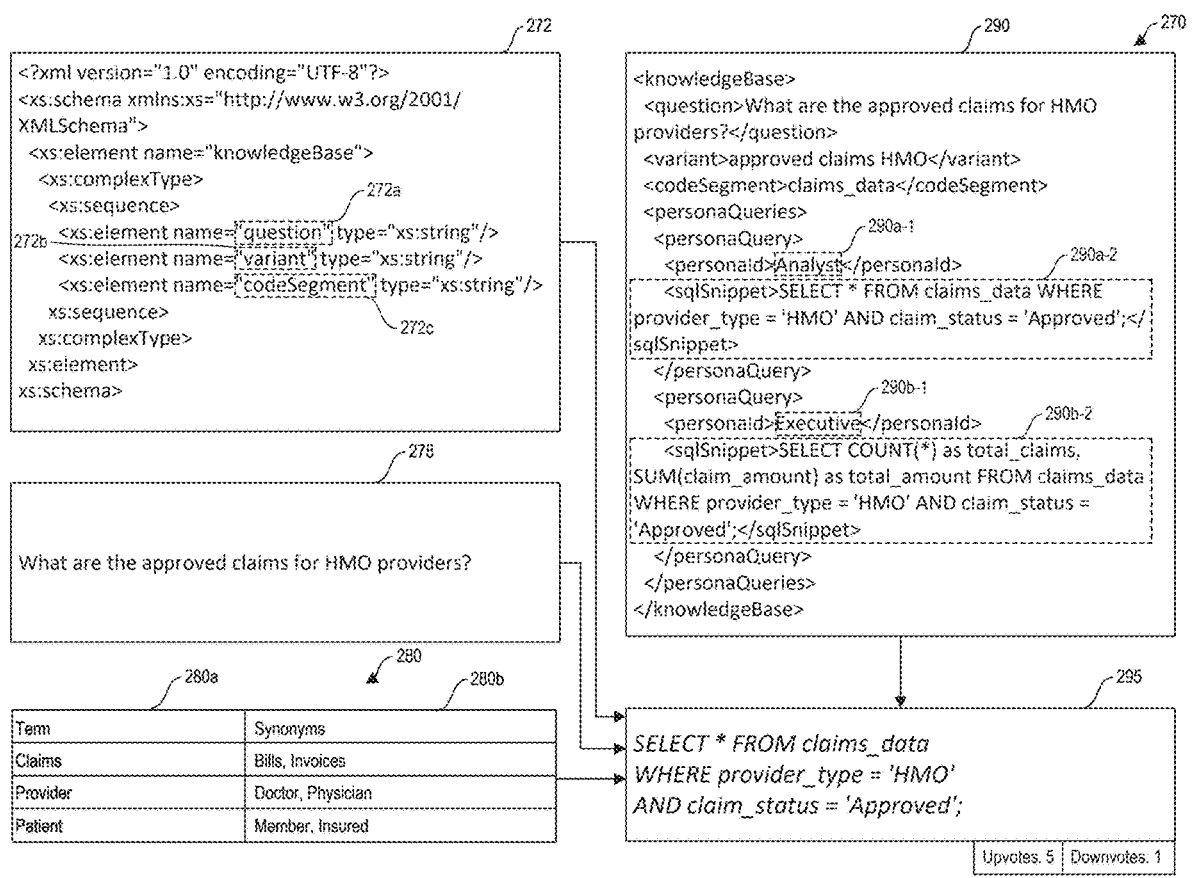

_272_

```
<?xml version="1.0" encoding="UTF-8"?>
<xs:schema xmlns:xs="http://www.w3.org/2001/
XMLSchema">
  <xs:element name="knowledgeBase">
    <xs:complexType>
      <xs:sequence>                           272a
272b ──<xs:element name="question" type="xs:string"/>
        <xs:element name="variant" type="xs:string"/>
        <xs:element name="codeSegment" type="xs:string"/>
      xs:sequence>                            272c
    xs:complexType>
  xs:element>
xs:schema>
```

_278_

What are the approved claims for HMO providers?

_280_

_280a_        _280b_

| Term | Synonyms |
|------|----------|
| Claims | Bills, Invoices |
| Provider | Doctor, Physician |
| Patient | Member, Insured |

_290_        _270_

```
<knowledgeBase>
  <question>What are the approved claims for HMO
providers?</question>
  <variant>approved claims HMO</variant>
  <codeSegment>claims_data</codeSegment>
  <personaQueries>
    <personaQuery>            290a-1
      <personaId>Analyst</personaId>      290a-2
      <sqlSnippet>SELECT * FROM claims_data WHERE
provider_type = 'HMO' AND claim_status = 'Approved';</
sqlSnippet>
    </personaQuery>
    <personaQuery>            290b-1
      <personaId>Executive</personaId>     290b-2
      <sqlSnippet>SELECT COUNT(*) as total_claims,
SUM(claim_amount) as total_amount FROM claims_data
WHERE provider_type = 'HMO' AND claim_status =
'Approved';</sqlSnippet>
    </personaQuery>
  </personaQueries>
</knowledgeBase>
```

_295_

```
SELECT * FROM claims_data
WHERE provider_type = 'HMO'
AND claim_status = 'Approved';
```

| Upvotes. 5 | Downvotes. 1 |
|------------|--------------|

_FIG. 2B_

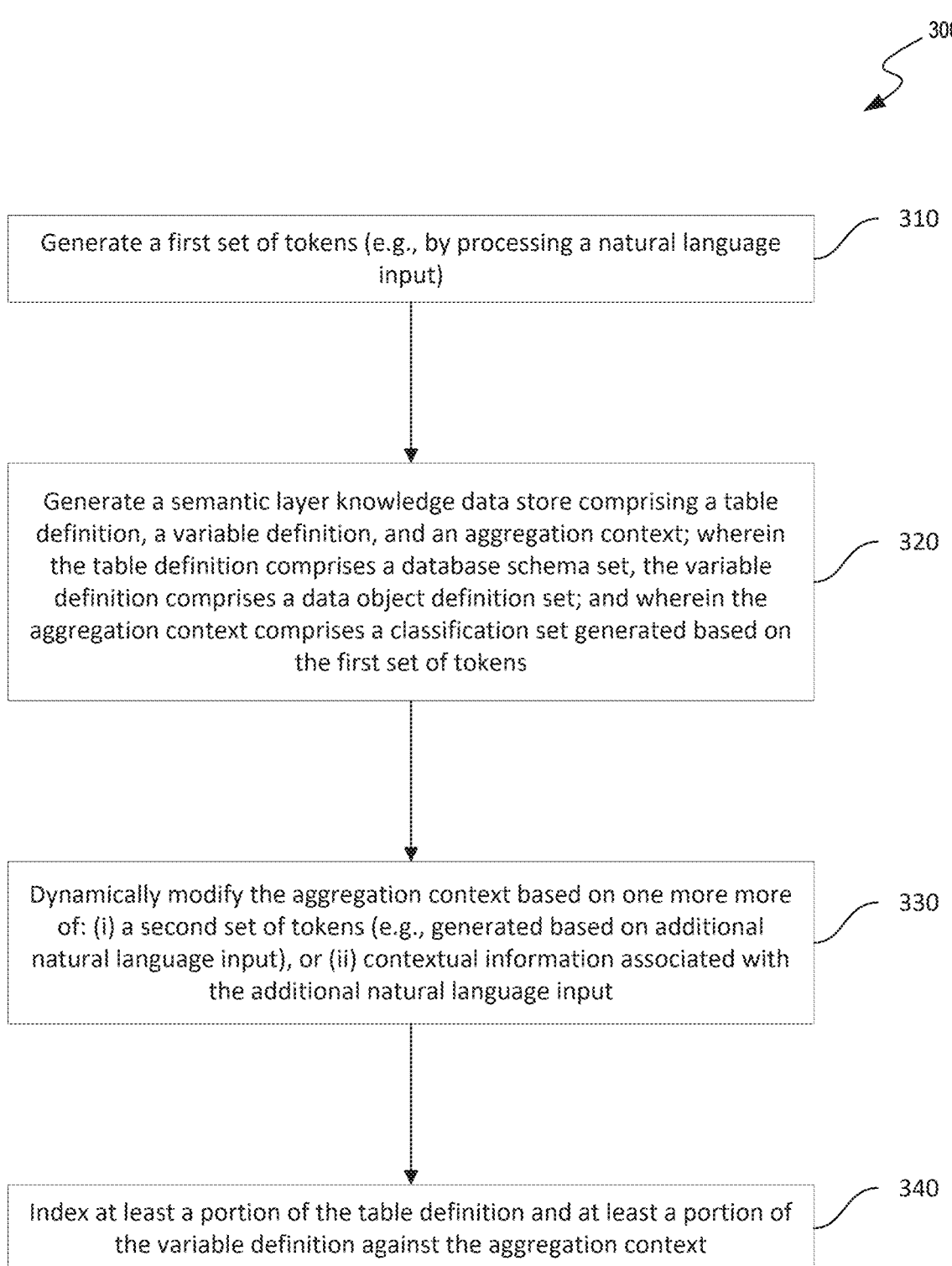

300

Generate a first set of tokens (e.g., by processing a natural language input)          310

Generate a semantic layer knowledge data store comprising a table definition, a variable definition, and an aggregation context; wherein the table definition comprises a database schema set, the variable definition comprises a data object definition set; and wherein the aggregation context comprises a classification set generated based on the first set of tokens          320

Dynamically modify the aggregation context based on one more more of: (i) a second set of tokens (e.g., generated based on additional natural language input), or (ii) contextual information associated with the additional natural language input          330

Index at least a portion of the table definition and at least a portion of the variable definition against the aggregation context          340

*FIG. 3A*

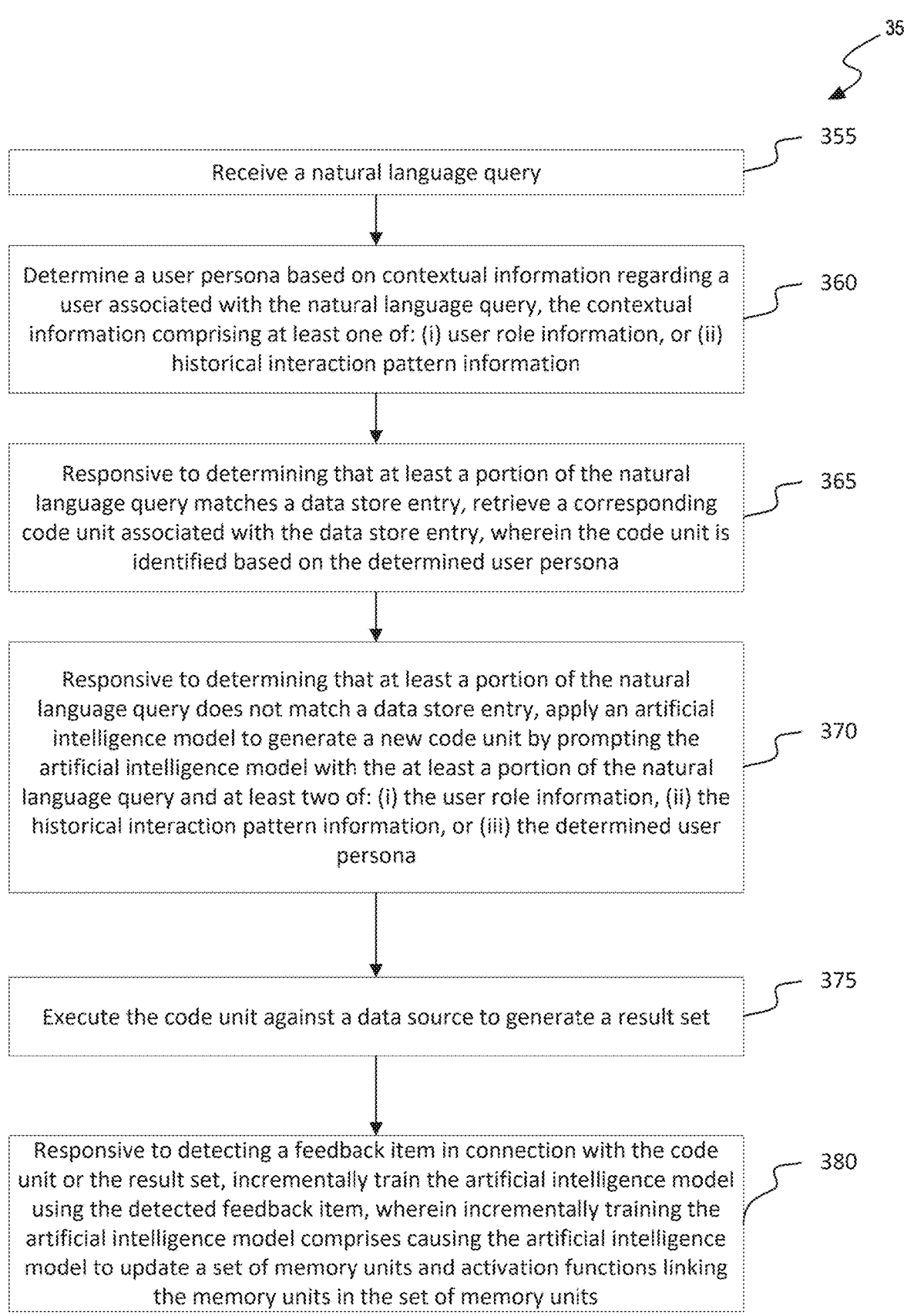

350

355

Receive a natural language query

360

Determine a user persona based on contextual information regarding a user associated with the natural language query, the contextual information comprising at least one of: (i) user role information, or (ii) historical interaction pattern information

365

Responsive to determining that at least a portion of the natural language query matches a data store entry, retrieve a corresponding code unit associated with the data store entry, wherein the code unit is identified based on the determined user persona

370

Responsive to determining that at least a portion of the natural language query does not match a data store entry, apply an artificial intelligence model to generate a new code unit by prompting the artificial intelligence model with the at least a portion of the natural language query and at least two of: (i) the user role information, (ii) the historical interaction pattern information, or (iii) the determined user persona

375

Execute the code unit against a data source to generate a result set

380

Responsive to detecting a feedback item in connection with the code unit or the result set, incrementally train the artificial intelligence model using the detected feedback item, wherein incrementally training the artificial intelligence model comprises causing the artificial intelligence model to update a set of memory units and activation functions linking the memory units in the set of memory units

*FIG. 3B*

PERSONALIZATION TECHNIQUES FOR CODE GENERATION PLATFORMS

BACKGROUND

Business intelligence (BI) refers to the processes, technologies, and tools used to improve decision-making and drive business performance. It involves collecting, integrating, and analyzing data from various sources, such as financial systems, customer databases, and operational systems, to provide insights and support informed decision-making. BI systems typically provide real-time or near-real-time data visualization, reporting, and analytics capabilities, enabling organizations to identify trends, optimize operations, and gain a competitive advantage. By leveraging data-driven insights, businesses can make informed decisions, improve customer satisfaction, and increase revenue. Effective BI systems typically rely on a combination of technical expertise, data quality, and business acumen to ensure that insights are actionable and drive meaningful business outcomes.

Conventional BI systems often struggle with several limitations. One major drawback is the inability to support natural language queries, forcing users to rely on predefined dashboards and complex query languages. Additionally, conventional BI systems lack contextualization capabilities, and, as such, conventional BI systems often fail to identify user roles and tailor responses accordingly. The absence of a robust semantic layer means that users often lack access to previously-generated query snippets (including SQL fragments, stored procedures, or parameterized queries), leading to redundant and inefficient query writing. Furthermore, conventional BI systems typically lack tunable feedback mechanisms, making it difficult to validate the accuracy of automatically generated queries. This can lead to incorrect insights and poor decision-making. Moreover, these systems often exhibit limited conversational flexibility, struggling to account for domain-specific vocabularies and linguistic variants, which can further hinder user adoption and effectiveness.

BRIEF DESCRIPTION OF THE DRAWINGS

Detailed descriptions of implementations of the present invention will be described and explained through the use of the accompanying drawings.

FIGS. 2A and 2B are block diagrams that illustrate semantic layer management and code unit (e.g., query) personalization operations of the conversational BI platform, in accordance with some implementations of the present technology.

FIG. 3A is a flow diagram that illustrates example semantic layer management operations of the conversational BI platform, in accordance with some implementations of the present technology.

FIG. 3B is a flow diagram that illustrates example code unit (e.g., query) personalization operations of the conversational BI platform, in accordance with some implementations of the present technology.

Figure 1:
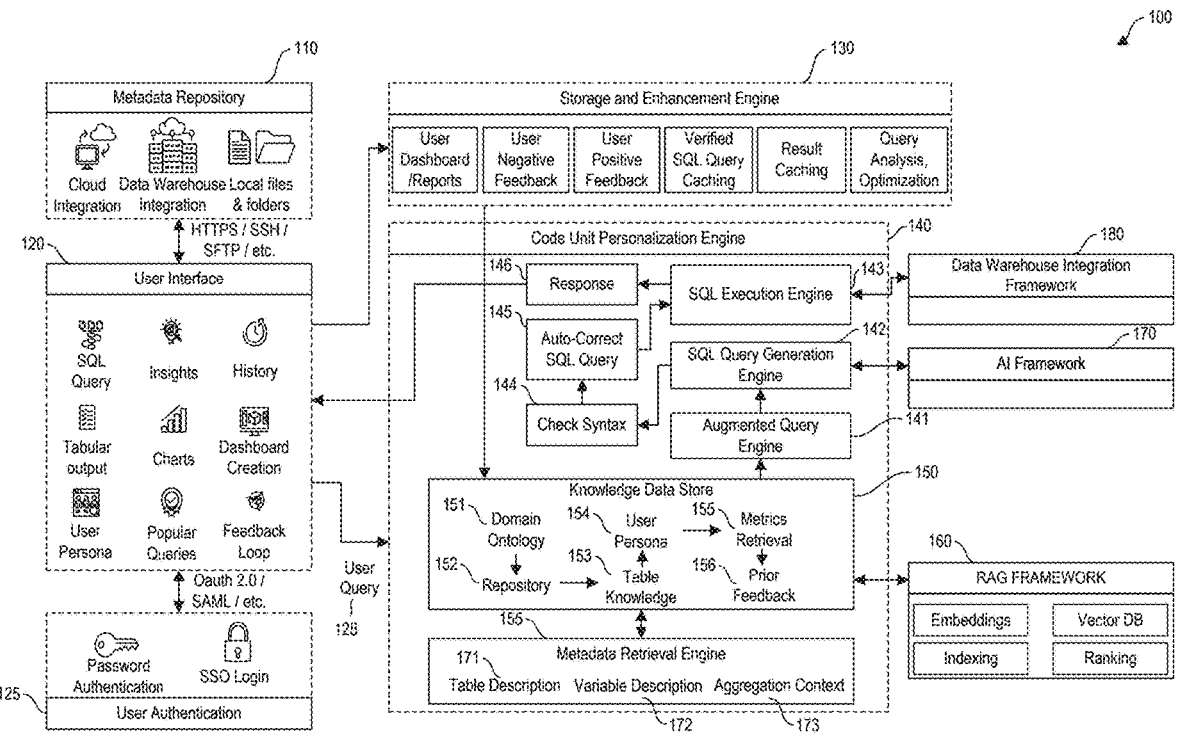
FIG. 1 is a block diagram that illustrates a conversational business intelligence (BI) platform that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed conversational BI platform enables significant technical advantages through its advanced semantic layer management capabilities. In some implementations, the platform can automatically generate and maintain comprehensive metadata repositories that include table descriptions, variable descriptions, and aggregation context information (stored in formats such as JSON, XML, YAML, or relational database schemas). This semantic layer can enable the platform to understand complex relationships between data entities and provide contextual information that enhances query accuracy. The platform can utilize artificial intelligence/machine learning (AI/ML) algorithms (such as neural networks, decision trees, or ensemble methods) to continuously update and refine the semantic layer based on user interactions and feedback, allowing the system to adapt to evolving data schemas and business requirements. Additionally, the semantic layer can support dynamic schema discovery and metadata enrichment, enabling the platform to automatically incorporate new data sources and maintain up-to-date semantic relationships without manual intervention.

The personalization engine of the conversational BI platform offers substantial technical improvements over conventional systems through its sophisticated user persona identification and code unit (e.g., query) customization capabilities. In some aspects, the platform employs advanced natural language processing techniques (such as transformer models, BERT, or GPT-based architectures) to analyze natural language user queries and automatically determine the most appropriate persona based on contextual clues, historical interactions, or organizational role information. The platform can maintain detailed user profiles (stored as structured data in formats such as JSON objects, database records, or key-value pairs) that include query patterns, preferred visualization types, and domain-specific terminology preferences, enabling highly tailored responses. Furthermore, the personalization engine can utilize collaborative filtering and recommendation algorithms (such as matrix factorization, deep learning models, or graph-based approaches) to suggest relevant queries and insights based on similar user behaviors and organizational patterns (e.g., for users with similar personas).

The conversational BI platform can achieve superior query generation accuracy through its integration of retrieval-augmented generation (RAG) frameworks with transformer-based language models. In some implementations, the disclosed platform can use vector embeddings (such as dense vectors with dimensions ranging from 128 to 1024 or higher, stored in formats like NumPy arrays, TensorFlow tensors, or PyTorch tensors) and semantic similarity matching to retrieve relevant metadata and code unit templates from its knowledge base, which can be used to inform the model's query generation process. This approach enables the platform to generate more contextually appropriate SQL queries (or other query languages such as NoSQL queries, GraphQL, or SPARQL and, more generally, code units) by incorporating domain-specific knowledge and previously validated query patterns. The platform can also employ reinforcement learning techniques that utilize human-in-the-loop feedback to continuously improve query generation quality, allowing the platform to learn from user corrections and preferences over time.

The platform can provide enhanced conversational flexibility through its multi-modal interface capabilities and adaptive dialogue management system. In some cases, the platform can support various interaction modalities including natural language chat interfaces, voice commands, and integration with collaboration platforms. The conversational interface can employ advanced natural language understanding techniques to handle ambiguous queries, ask clarifying questions, and maintain context across extended dialogue sessions.

The conversational BI platform can offer significant performance and scalability advantages through its distributed architecture and intelligent caching mechanisms. In some implementations, the platform can employ sophisticated query optimization techniques that analyze generated SQL queries and apply syntactic transformations to improve execution performance. The platform can utilize query caching and/or result caching strategies, with intelligent cache invalidation policies that ensure data freshness while maximizing cache hit rates. Furthermore, the system can support horizontal scaling through distributed metadata storage and use/caching of pre-generated code units, enabling the platform to handle enterprise-scale deployments with millions of metadata entries while maintaining sub-second response times for user queries.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples. Example Conversational Business Intelligence (BI) Platform FIG. 1 is a block diagram that illustrates a conversational business intelligence (BI) platform 100 that can implement aspects of the present technology. The conversational BI platform 100 enables BI operations, such as data analysis, reporting, and business intelligence, through various interface modalities. The operations can be enabled through computer applications, which can include, but are not limited to, web-based interfaces (built using technologies such as HTML5, CSS3, JavaScript, React, Angular, or Vue.js), chat-based interfaces (implemented using chatbot frameworks such as Microsoft Bot Framework, Dialogflow, or Rasa), voice-activated interfaces (utilizing speech recognition services such as Amazon Alexa Skills Kit, Google Assistant Actions, or Azure Cognitive Services), or integrations with collaboration platforms. The applications can include graphical user interfaces (GUIs) that can be configured to provide a suite of business intelligence tools, including, for example, interactive dashboards with drill-down capabilities, data visualizations (rendered using libraries such as D3.js, Chart.js, Plotly, or Tableau Embedded API), and analytics.

In some implementations, users can interact with the conversational BI platform 100 via a chatbot interface, where the user inputs a query in natural language and receives, in response, query results, data visualizations, or alerts. In some implementations, the chatbot interface invokes a user input parser (implemented using natural language processing libraries such as spaCy, NLTK, or Stanford CoreNLP) to analyze and tokenize the natural language query, identifying key entities, intent, and context. The parsed input is matched against a synonym list (stored as data structures such as hash maps, tree structures, or database lookup tables), which can map user-provided terms to corresponding database schema elements, ensuring accurate query formulation. The conversational BI platform 100 can utilize a SQL query stub store (implemented as a repository using databases such as PostgreSQL, MongoDB, or file-based storage in formats like JSON or YAML), which can provide computer-executable instructions (e.g., AI generative instructions, prompts, query templates) tailored to specific business intelligence tasks, such as sales analysis or customer segmentation. In some implementations, the tasks, tone, output fields, or other parameters can be determined based on user persona, which can be determined based on contextual information associated with a user (e.g., user role), a history of user interactions, or analysis of the user's input query.

To generate SQL queries (or other query languages such as NoSQL queries for MongoDB, Cypher for Neo4j, or HiveQL for Apache Hive), the conversational BI platform 100 can apply an AI/ML model, such as a transformer-based model (including architectures such as GPT, BERT, T5, or custom transformer implementations using frameworks like PyTorch, TensorFlow, or Hugging Face Transformers) that takes the parsed input and schema information as input, producing a SQL query as output. The model can be trained using reinforcement learning (implemented using algorithms such as PPO, A3C, or DQN, with frameworks like OpenAI Gym, Stable Baselines3, or Ray RLlib), where human-in-the-loop feedback is incorporated (e.g., through upvotes and downvotes stored as numerical ratings, boolean values, or categorical labels in database records) on the generated queries. This feedback loop enables the model to refine its performance over time, adapting to the nuances of user queries and the underlying data schema. The persona store (implemented using data storage solutions such as relational databases, NoSQL document stores, or in-memory caches) provides additional context about the user's role, preferences, and query history, allowing the platform to tailor the query results and visualizations to the individual user's needs.

The SQL query (or, more generally, a generated code unit) is executed against the underlying data sources (which may include relational databases such as MySQL, PostgreSQL, or Oracle, data warehouses such as Amazon Redshift, Google BigQuery, or Snowflake, or big data platforms such as Apache Hadoop or Apache Spark), and the results are returned to the user in the form of query results, data visualizations, or alerts. In some implementations, the use of transformer-based models and reinforcement learning enables conversational BI platform 100 to generate accurate and relevant SQL queries, reducing the need for manual query writing and enabling users to focus on advanced analytics and decision-making. In some implementations, the conversational BI platform 100 includes a dashboard builder interface (developed using web technologies such as React, Angular, or Vue.js with drag-and-drop libraries like React DnD or Angular CDK) configured to enable users to create custom dashboards using drag-and-drop tools, interactive visualizations, and real-time data updates. The conversational BI platform 100 can also be configured to enable users to set up automated reporting and notification systems (implemented using scheduling services such as Apache Airflow, Celery, or cloud-based solutions like AWS Lambda with CloudWatch Events), thereby ensuring timely insights and data-driven decision-making.

As shown, the conversational BI platform 100 includes or has provided thereto a metadata repository 110, a user interface engine 120, a user authentication engine 125, a storage and enhancement engine 130, a code unit personalization engine 140, a knowledge data store 150, a metadata retrieval engine 155, a data warehouse integration framework 180, a RAG framework 160, and/or an AI framework 170.

The metadata repository 110 stores information about the data sources, such as schema definitions (in formats such as JSON Schema, XML Schema Definition (XSD), or database-specific formats like PostgreSQL's information_schema), data types (including primitive types such as INTEGER, VARCHAR, BOOLEAN, TIMESTAMP, as well as complex types such as JSON, ARRAY, or user-defined types), and relationships. The metadata repository 110 can also store executables that enable cloud integration (using APIs and SDKs for platforms such as AWS, Azure, or Google Cloud Platform), data warehouse integration (through connectors for systems such as Snowflake, Amazon Redshift, Google BigQuery, or Apache Hive), and access to file structures on various systems, such as local or distributed file systems (including HDFS, Amazon S3, Azure Blob Storage, or Google Cloud Storage). For instance, the metadata repository 110 can store connectors for data ingestion frameworks like Apache NiFi, AWS Kinesis, or Google Cloud Dataflow, as well as executables for integrating with data warehouses that utilize columnar storage like Apache Cassandra, Apache HBase, or Amazon Redshift. The metadata repository 110 works in conjunction with the metadata retrieval engine 155, which functions to retrieve and process metadata from various data sources. The metadata can include table descriptions 171, variable descriptions 172, and aggregation context 173, which provide context for data processing and analysis.

Table descriptions 171 can include database schema information such as table names, descriptions, and categorizations, as well as relationships between tables. For example, a table description for a "customer_data" table can include metadata indicating that the table name is "customer_data", the description is "Customer demographic information", and the categorization is "PII [Personally Identifiable Information] Data", with relationships to other tables, such as the "transaction_data" table, established through joins using suitable algorithms, including hash joins, sort-merge joins, or nested loop joins, depending on the specific use case and data distribution.

Variable descriptions 172 can include variable information such as column names, data types (such as INTEGER, BIGINT, DECIMAL, VARCHAR, TEXT, DATE, TIMESTAMP, BOOLEAN, JSON, or BLOB), and descriptions, as well as additional metadata. For instance, a "customer_age" column can be described as an integer data type with a description of "Customer age in years". Additional metadata can specify that the data domain for "customer_age" is restricted to values between 18 and 100, that the column is not nullable, and that it has a data distribution that is skewed toward a particular age group. Variable relationships can be associated with correlations. For example, a stored correlation can indicate that "customer_age" is correlated with the "purchase_frequency" column, and data validation rules can specify that "customer_age" be validated against a reference dataset using techniques like data matching or record linkage (implemented using algorithms such as Levenshtein distance, Jaro-Winkler similarity, or machine learning-based entity resolution) to ensure data consistency.

Aggregation context 173 can include information such as aggregation operations, like SUM or AVERAGE (as well as other statistical functions such as COUNT, MIN, MAX, MEDIAN, STDDEV, or PERCENTILE), as well as common query patterns or templates, such as "Top N customers by purchase frequency" or "Customer segmentation by demographic". Additionally, aggregation context 173 can also involve analyzing a user's history of queries to enable personalization, such as identifying frequently accessed data sources, commonly used filters, or preferred visualization types. This contextual information can be used to optimize query performance, suggest relevant queries, or provide tailored results that meet the user's specific needs. Derived metrics, such as customer lifetime value (CLV), can be calculated using formulas (expressed in programming languages such as SQL, Python, R, or domain-specific languages) that incorporate sets of columns, such as (average_order_value*purchase_frequency*customer_lifespan). The calculation of CLV can be further refined by leveraging the user's query history, for instance, by using the time horizon specified in the user's recent queries (e.g., "customer purchases over the last 6 months") to determine the relevant time period for calculating customer lifespan. Similarly, if a user frequently queries for metrics related to customer retention, the CLV calculation can be adjusted to prioritize retention rates and reduce the impact of one-time customers. By incorporating insights from the user's query history, the CLV calculation can be tailored to provide a more relevant and actionable metric that aligns with the user's specific business needs and priorities.

In some implementations, aggregation context 173 can also include data freshness requirements hat specify that data (e.g., customer data, user data) must be up-to-date within a certain time frame, such as the last hour. In some implementations, query optimization hints can include recommendations to use parallel processing frameworks such as Apache Spark (with APIs in Scala, Java, Python, or R), distributed query engines like Presto (or Trino), or columnar storage engines such as Apache Parquet (or Apache ORC, or Delta Lake) to improve query performance on large datasets.

In some implementations, aggregation context 173 can include user persona information, which can be determined and dynamically updated based by tokenizing and analyzing user input and/or contextual information that accompanies user input (e.g., user role, clearance level, group, policy, permission set, data freshness requirements, and so forth). For example, user N can be associated with an "analyst" role and a "manager" role, user M can be associated with several organizations, and so forth. This information can be utilized to index the table and/or variable description information such that distinct code sets can be accessed (or generated) and prioritized based on detected user roles associated with subsequent user queries.

The user interface engine 120 generates and renders the conversational interface, chatbot interface, or other user-facing components of the platform. For example, the user interface engine 120 can function to receive query result sets (e.g., results of executing personalized queries against internal or external data stores returned in formats such as JSON, XML, CSV, or binary result sets), queries (in languages such as SQL, NoSQL query languages, or natural language), user personal information (stored as structured data in formats such as JSON objects, XML documents, or database records), feedback/model training information, and so forth. These elements can be received in a single data stream (e.g., a result set bound to metadata that includes the raw query, model explainability details, and other information) or in separate data streams, at different temporal intervals or substantially contemporaneously. The user interface engine 120 can bind the received items to configurable artifacts, such as GUI components (implemented using UI frameworks such as React, Angular, Vue.js, or native mobile frameworks like SwiftUI or Jetpack Compose) that represent queries, insights, histories, query output, charts (rendered using visualization libraries such as D3.js, Chart.js, Highcharts, or Plotly), dashboards, persona information, popular queries, feedback information (e.g., upvote/downvote controls) and so forth.

The user interface engine 120 can include a chatbot (built using frameworks such as Microsoft Bot Framework, Dialogflow, Rasa, or custom implementations using WebSocket connections), text control, or another suitable element set for receiving and processing user input. User input can include natural-language input (processed using NLP libraries such as spaCy, NLTK, or cloud-based services like Google Cloud Natural Language API), edits to generated queries (captured through code editors such as Monaco Editor, CodeMirror, or Ace Editor), a model parameter (represented as numerical values, configuration objects, or hyperparameter dictionaries), an indication of a data source (specified through connection strings, URIs, or configuration objects), an AI/ML model prompt (formatted as text strings, structured templates, or JSON objects), and the like. For example, a user can ask, "What are the top 5 product categories by gross margin in the Western region for the last 12 months, and how do they compare to the same period last year?" For example, a user can edit a generated query to change the aggregation level from monthly to quarterly, or to add a filter for specific product SKUs. For example, a user can adjust a model parameter to change the forecasting algorithm from ARIMA to Prophet (or other time series models such as LSTM, GRU, or seasonal decomposition methods), or to tune hyperparameters such as seasonality or trend sensitivity. For example, a user can provide an AI/ML model prompt such as "Develop a predictive model to identify high-value customer segments based on demographics, purchase history, and browsing behavior, and estimate the potential revenue impact of targeted marketing campaigns."

In an illustrative use case, a user can invoke a predictive analytics model, such as a customer lifetime value (CLV) model (implemented using machine learning algorithms such as linear regression, random forest, gradient boosting, or neural networks), with a prompt like "Generate a report showing the top 10% of customers by predicted CLV for the next 6 months, along with their demographic and purchase history profiles." The user interface engine 120 can then retrieve (if a similar query was previously generated, for example, and cached for future use) or generate a query) to retrieve the relevant data, such as customer demographics, purchase history, and browsing behavior, and pass the data to the CLV model for prediction. The model can then generate a report showing the top 10% of customers by predicted CLV, along with their profiles and estimated revenue potential. The user interface engine 120 can then render the report in a visual format, such as a bar chart or scatter plot (using visualization libraries such as D3.js, Chart.js, Plotly, or Tableau Embedded API), and provide interactive features for the user to drill down into the data and explore the results further. In some implementations, data presentation parameters for the report can be stored for a particular user or user persona to customize the displayed report.

The user interface engine 120 works in conjunction with the user authentication engine 125, which functions to authenticate and authorize users (using protocols such as OAuth 2.0, SAML, OpenID Connect, or JWT tokens), ensuring that only authorized users can access specific data sources and features. The user authentication engine 125 can also function to implement guardrails, which can limit user access to data sources, models, model output, and so forth. To continue the illustrative example, the user authentication engine 125 can restrict access to sensitive customer data, such as PII or financial data, to only those users who have been granted explicit permission. This can be achieved through role-based access control (RBAC) or attribute-based access control (ABAC) systems, where users are assigned roles, and each role has specific permissions to access certain data sources or features. The user authentication engine 125 can also implement guardrails on models, such as limiting access to the CLV model to only those users who have completed training on data science and predictive analytics. This can prevent users from misusing the model or interpreting its results incorrectly. Furthermore, the user authentication engine 125 can implement guardrails on model output, such as limiting the level of granularity or precision of the CLV predictions based on user role or clearance level. For instance, a marketing analyst may only be able to see aggregated CLV predictions for customer segments, while a senior manager may have access to individual-level CLV predictions. In this manner, the user authentication engine 125 can ensure that sensitive data and models are protected, and that users only have access to the information and features that they need to perform their jobs. This can help prevent data breaches, unauthorized model use, and other security risks, while also ensuring compliance with regulatory requirements and organizational policies.

The storage and enhancement engine 130 functions to store and process data, including data ingestion (using tools such as Apache Kafka, Apache NiFi, or cloud-based services like AWS Kinesis), data transformation (implemented using ETL tools such as Apache Airflow, Talend, or dbt, or programming languages such as Python, Scala, or SQL), and data enrichment (through APIs, external data sources, or machine learning models). In some implementations, the storage and enhancement engine 130 can be integrated with the user interface engine 120 to enable generation and/or provisioning of dashboards and reports, receipt and processing of user validation and feedback (e.g., for reinforcement training of AI/ML models, as described in connection with FIGS. 5 and 6), query caching (using caching systems such as Redis, Memcached, or in-memory data structures) (e.g., caching of verified SQL queries for reuse by one or more users), result caching (e.g., caching of frequently used result sets for reuse by one or more users), query analysis (using static analysis tools, AST parsers, or query plan analyzers) (e.g., via static or dynamic code analysis), and query optimization (through rule-based optimizers, cost-based optimizers, or machine learning-based optimization techniques) (e.g., by generating and applying syntactic changes to AI-generated queries to improve query performance).

In some implementations, the storage and enhancement engine 130 collects user feedback on the accuracy and relevance of results generated by AI/ML models. This feedback can take various forms, including explicit ratings, such as upvotes/likes or downvotes/dislikes (stored as Boolean values, numerical scores, or categorical labels), and implicit feedback, such as query reformulations or result clicks (tracked through event logging systems, analytics platforms, or database records). For instance, users can provide feedback on predicted customer segments, indicating whether the segments are accurate or not, or they can provide feedback on the relevance of recommended products. This feedback is used to retrain the AI/ML model (using techniques such as online learning, batch retraining, or transfer learning) and adjust its parameters to better align with user expectations.

In some implementations, the storage and enhancement engine 130 performs code unit caching. For example, frequently used SQL queries (or other query types such as NoSQL queries, GraphQL queries, or API calls) are stored in a cache (implemented using technologies such as Redis, Memcached, Apache Ignite, or in-memory hash tables), allowing them to be reused by multiple users or applications. The caching criteria can include factors such as query frequency, query complexity, or data freshness. For example, queries that are executed daily or weekly might be cached, while queries that are executed infrequently might not be cached. Additionally, the cache can be shared across multiple users or applications, with criteria for sharing including factors such as user role, department, or security clearance. For instance, a cache of sales data might be shared across all sales teams, while a cache of financial data might be restricted to users with a certain security clearance.

In some implementations, the storage and enhancement engine 130 performs result caching. The results of frequently executed queries (stored in formats such as JSON, CSV, Parquet, or serialized objects) are stored in a cache, allowing the engine to quickly return the cached results when the same query is executed again. The criteria for sharing cached results can include factors such as data freshness, user permissions, and query parameters. For example, cached results might be shared across all users who have permission to access the underlying data, but might be invalidated if the data changes. Guardrails can be implemented to ensure that cached results are not shared inappropriately, such as by limiting the scope of the cache or implementing access controls. The storage and enhancement engine 130 can also perform knowledge data and/or metadata caching (using distributed caching systems or content delivery networks) based on recency criteria, access volume over a period of time, data cleanliness or reliability metric, custodial entity associated with the data, or another suitable set of criteria.

In some implementations, the storage and enhancement engine 130 performs query analysis to optimize queries. This can include static analysis (using tools such as SQL parsers, AST analyzers, or custom rule engines), which examines the query syntax and structure, or dynamic analysis (using query profilers, execution plan analyzers, or runtime monitoring tools), which examines the query execution plan and runtime statistics. For example, the storage and enhancement engine 130 can analyze a query to identify inefficient joins or subqueries, and suggest alternative query structures that could improve performance. The engine might also analyze the query execution plan to identify bottlenecks and suggest optimization techniques, such as indexing or partitioning.

In some implementations, the storage and enhancement engine 130 generates and applies syntactic transformations to code units, such as AI-generated queries (using rule-based systems, pattern matching algorithms, or machine learning-based code transformation models) to optimize their performance. For example, if an AI model (e.g., a model accessed by a framework 170, such as a transformer or similar model described in connection with FIGS. 5 and/or 6) generates a query that uses a HAVING clause to filter results, the engine can apply a transformation to rewrite the query using a WHERE clause instead, which can improve performance by reducing the amount of data that needs to be processed. Other examples of syntactic transformations include rewriting queries to use joins instead of subqueries, or rewriting queries to use aggregate functions instead of sorting and grouping. By applying these transformations, the engine can improve the performance and efficiency of AI-generated queries. In some implementations, the storage and enhancement engine 130 can include deterministic logic (implemented as rule engines, decision trees, or finite state machines) or recursive prompts (using iterative AI model calls or chain-of-thought reasoning) to evaluate and incrementally improve AI-generated queries, with predefined absolute (e.g., a score represented as floating-point numbers, integers, or normalized values) or relative (e.g., a relative amount, such as percentage, of optimization achieved relative to baseline) criteria.

The code unit personalization engine 140 functions to tailor query results to individual users based on their preferences, roles, and query history. In some implementations, the code unit personalization engine 140 can receive a user query 128, parse or tokenize the user query 128 (using tokenization libraries such as spaCy, NLTK, or Hugging Face Tokenizers), and use the token set to obtain supplemental information from the knowledge data store 150. The knowledge data store 150 contains domain-specific knowledge and ontologies (stored in formats such as RDF, OWL, JSON-LD, or custom knowledge graph representations) that inform the platform's understanding of user queries and enable more accurate results.

The knowledge data store 150 can work in conjunction with the RAG (Retrieval-Augmented Generator) framework 160 and/or AI framework 170, which provide advanced natural language processing and machine learning capabilities, enabling the conversational BI platform 100 to generate accurate and relevant responses to user queries. The RAG framework 160 can enable storage of embeddings (as dense vectors in formats such as NumPy arrays, TensorFlow tensors, or specialized vector databases like Pinecone or Weaviate), vectors, indexes (using indexing technologies such as FAISS, Annoy, or Elasticsearch), ranking information (stored as numerical scores, priority queues, or sorted lists), and other information that facilitates retrieval-augmented data processing. In various use cases, the knowledge data store 150 can invoke RAG functionality to retrieve domain ontologies, synonym lists, user persona information, table knowledge information, prior feedback information, and so forth. For example, when a user asks "What are the top-performing products by revenue?", the knowledge data store 150 can invoke RAG functionality to retrieve relevant metrics, such as "revenue" and "top-performing products", and use this information to tune the query (e.g., identify data objects, query criteria, and so forth) to improve result accuracy. For example, when a user is associated with multiple personas, such as "Marketing Analyst" and "Sales Manager", the knowledge data store 150 can access persona information and query history rank information to resolve the user's current persona and provide relevant results. For example, when a user asks a query, the knowledge data store 150 can retrieve embeddings that correspond to query history tokens and corresponding database objects to determine whether the current query is semantically similar to any prior queries by the user or users associated with the determined user persona. This can enable the conversational BI platform 100 to provide comparatively more accurate and personalized results, such as suggesting related queries or providing additional context.

Figure 6:
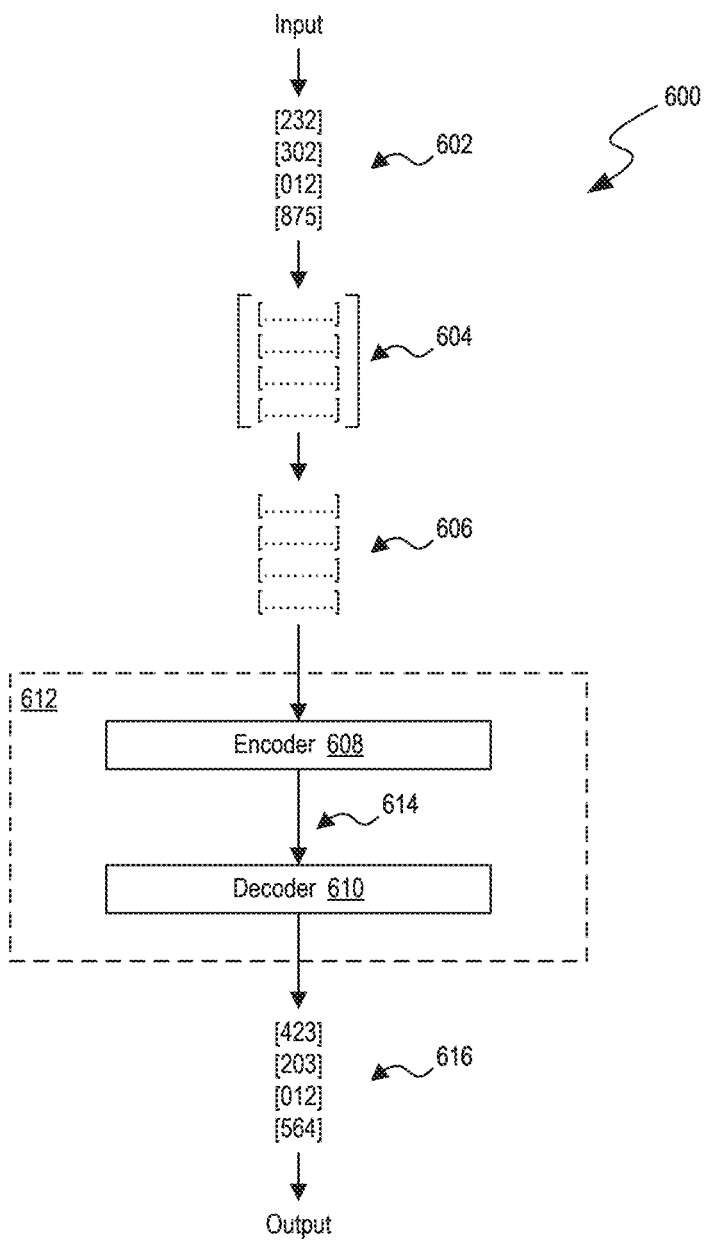
FIG. 6 is a block diagram of an example transformer that can implement aspects of the present technology.

The automated query engine 141 of the code unit personalization engine 140 can include the generated embeddings, persona information, tokens (e.g., portions or derivatives of the user question), table definition (in formats such as JSON schema, XML schema, or database metadata objects), query snippets (stored as text templates, parameterized queries, or code fragments), and other information in a prompt (formatted as structured text, JSON objects, or domain-specific prompt templates) invokable by the SQL query generation engine 142 to generate a query (as described, for example, in reference to FIG. 6). The syntax checker 144 can check the generated query (using SQL parsers, grammar validators, or database-specific syntax checkers), and the autocorrect module 145 can automatically correct the generated query (using rule-based correction systems, machine learning models, or template-based fixes). The SQL execution engine 143 can execute the generated query (through database drivers such as JDBC, ODBC, or database-specific connectors) (e.g., by invoking the data warehouse integration framework 180) and return a response 146, which can include a result set (in formats such as JSON, CSV, XML, or binary result sets) and/or metadata visualized by the user interface engine 120.

The data warehouse integration framework 180 functions to enable integration with external data warehouses and databases. The queries generated by the conversational BI platform 100 can be executable against internal or external data warehouses or databases via query protocols, such as SQL (Structured Query Language) (including variants such as T-SQL, PL/SQL, or PostgreSQL), ODBC (Open Database Connectivity), JDBC (Java Database Connectivity), or APIs (Application Programming Interfaces) for cloud-based data warehouses (e.g., Amazon Redshift, Google BigQuery, or Snowflake) (using REST APIs, GraphQL endpoints, or proprietary SDKs), facilitating seamless data access and querying across distinct data sources and systems.

Figure 2A:
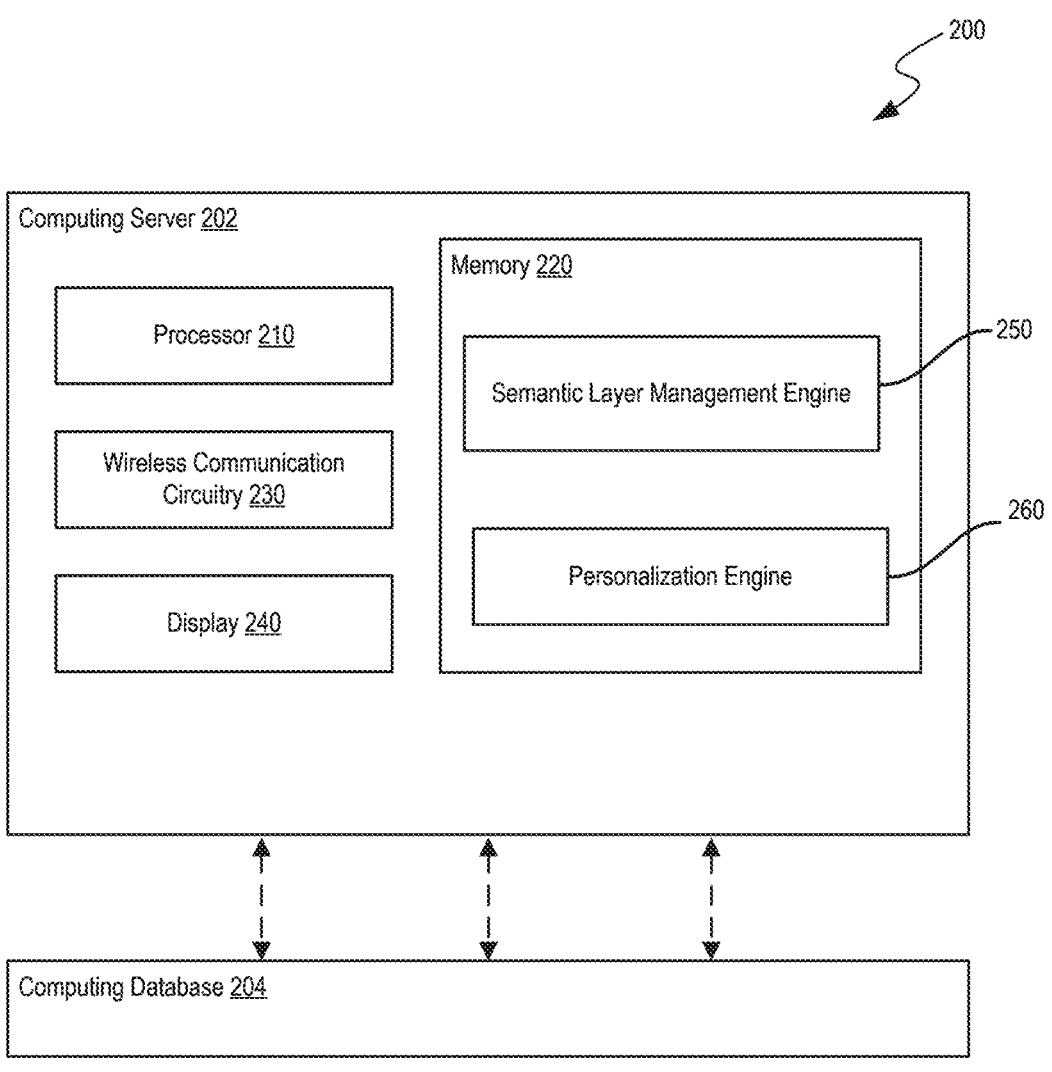

Semantic Layer Management and Code Unit Personalization Aspects of the Conversational BI Platform FIGS. 2A and 2B are block diagrams that illustrate semantic layer management and code unit personalization operations of the conversational BI platform 100 of FIG. 1, in accordance with some implementations of the present technology. FIG. 2A shows certain component parts of an example computing system 200 illustrating an implementation of the conversational BI platform 100, and FIG. 2B shows an example data flow 270 illustrating example semantic layer management and code unit personalization operations that can be performed using the computing system 200.

As shown in FIG. 2A, computing system 200 can include a computing server 202, which can be a physical or logical compute entity configured to perform various semantic layer management and code unit personalization operations, such as the operations of FIG. 2B. The computing server 202 includes a processor 210 (such as x86, ARM, or RISC-V architectures, including multi-core processors or specialized processors like GPUs or TPUs), a memory 220 (including RAM types such as DDR4, DDR5, or high-bandwidth memory, and storage types such as SSDs, NVMe drives, or traditional hard drives), a wireless communication circuitry 230 (supporting protocols such as Wi-Fi 6, Bluetooth 5.0, cellular networks, or Ethernet connections) to establish wireless communication and/or information channels (e.g., Wi-Fi, internet, APIs, communication standards) with other computing devices and/or services (e.g., servers, databases, cloud infrastructure), and a display 240 (e.g., user interface) (such as LCD, OLED, or e-ink displays, or headless configurations for server deployments). The processor 210 can have generic characteristics similar to general-purpose processors, or the processor 210 can be an application-specific integrated circuit (ASIC) that provides arithmetic and control functions to the computing server 202. While not shown, the processor 210 can include a dedicated cache memory (such as L1, L2, or L3 caches with varying sizes and associativity). The processor 210 can be coupled to components of the computing server 202, either directly or indirectly, for data communication.

Figure 4:
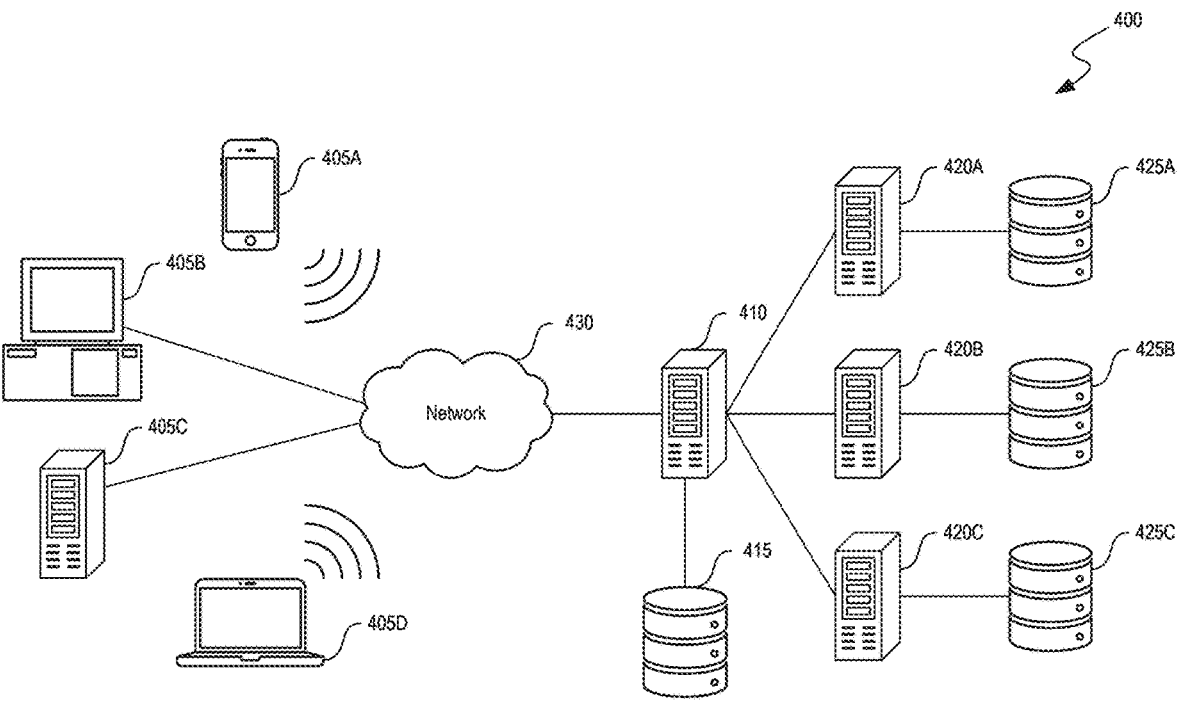
FIG. 4 is a system diagram illustrating an example of a computing environment in which the conversational BI platform operates in some implementations.

Further, the processor 210 of the computing server 202 can be communicatively coupled to a computing database 204 that is hosted alongside the computing server 202 on the core network 406 described in reference to FIG. 4. The computing database 204 can include data stores configured to store queries, insights, history, charts, dashboards, user persona information, ontologies, variable descriptions, embeddings, vectors, indexes, training information (inputs, outputs, validation information such as scores, upvotes, downvotes), thresholds, and the like. The data stores can be implemented as relational databases, such as MySQL or PostgreSQL (or other RDBMS such as Oracle, SQL Server, or SQLite) (e.g., to support storage of structured data and complex transactions); NoSQL databases such as MongoDB or Cassandra (or other NoSQL systems such as CouchDB, DynamoDB, or Redis) (e.g., to handle large amounts of unstructured or semi-structured data and offer flexible schema designs); graph databases such as Neo4j (or other graph databases such as Amazon Neptune, ArangoDB, or TigerGraph) (e.g., to support storing and querying complex relationships between data entities), and/or distributed file systems such as HDFS (or other distributed storage systems such as Amazon S3, Google Cloud Storage, or Azure Blob Storage) (e.g., to support storing large files and handling big data workloads). Additionally, data stores can include key-value pairs (using systems such as Redis, DynamoDB, or Riak), XML files (with parsers such as lxml, ElementTree, or SAX), addressable memory stores (such as in-memory databases like SAP HANA or VoltDB), metadata stores (such as Apache Atlas or DataHub), vector stores (such as Pinecone, Weaviate, or Chroma), indexes/indexed data (using indexing technologies such as Elasticsearch, Solr, or database-specific indexes), or other similar data structures. In some implementations, the data files can include data warehouse computing systems and/or integration frameworks therefor, such as Apache Hive, Amazon Redshift, Google BigQuery, or Snowflake (or other data warehouse solutions such as Azure Synapse, Databricks, or Teradata). In some implementations, the data stores can include AI/ML models and/or frameworks therefor, such as those described in connection with FIG. 5.

The memory 220 can comprise any suitable type of storage device including, for example, a static random-access memory (SRAM), dynamic random-access memory (DRAM) (including variants such as DDR4, DDR5, or LPDDR), electrically erasable programmable read-only memory (EEPROM), flash memory (including NAND flash, NOR flash, or 3D NAND), latches, and/or registers. In addition to storing instructions that can be executed by the processor 210, the memory 220 can also store data generated by the processor 210 (e.g., when executing the modules of the conversational BI platform 100). In additional or alternative embodiments, the processor 210 can store temporary information onto the memory 220 and store long-term data onto the computing database 204. The memory 220 is merely an abstract representation of a storage environment. Hence, in some embodiments, the memory 220 comprises one or more actual memory chips or modules (such as DIMMs, SO-DIMMs, or embedded memory modules).

Modules of the memory 220 can include a semantic layer management engine 250 and/or a personalization engine 260. These engines can be disposed or executable, in whole or in part, on more than one computing system, such as a distributed computing system (using frameworks such as Apache Spark, Kubernetes, or Docker Swarm) or client/server computing system (implemented using architectures such as REST APIs, microservices, or traditional three-tier architectures). More generally, implementations of the computing server 202 include additional, fewer, or different modules, or distribute functionality differently between the modules. As used herein, the term "module" and/or "engine" refers broadly to software components (such as libraries, frameworks, or executable programs), firmware components (such as embedded software or device drivers), and/or hardware components (such as ASICs, FPGAs, or dedicated processors). Accordingly, the semantic layer management engine 250 and personalization engine 260 could each comprise software, firmware, and/or hardware components implemented in, or accessible to, the computing server 202.

The semantic layer management engine 250 can work in conjunction with the personalization engine 260 to enable personalized query operations. For example, users can interact with the conversational BI platform 100, where the user inputs a query 278 in natural language and receives, in response, query results, data visualizations, or alerts. In some implementations, the chatbot interface invokes a user input parser (implemented using NLP libraries such as spaCy, NLTK, or cloud-based services such as Google Cloud Natural Language API or AWS Comprehend) to analyze and tokenize the natural language query 278, identifying key entities, intent, and context. The parsed input is matched against a synonym list 280 (stored in data structures such as hash maps, tries, or database lookup tables), which can map (e.g., by cross-referencing terms 280a to synonyms 280b) user-provided terms to corresponding database schema 272 elements, ensuring accurate query formulation. The schema 272 can include, for example, questions 272a, question variants 272b, and corresponding code segments 272c (stored as text strings, parameterized templates, or executable code objects). The conversational BI platform 100 can utilize a SQL query stub store 290 (implemented as a repository using databases, file systems, or in-memory caches) (e.g., by cross-referencing code segments 272c to code snippets 290a-2, 290b-2 and/or by searching for a persona 290a-1, 290b-1), which can provide computer-executable instructions (e.g., AI generative instructions, prompts, query templates) tailored to specific business intelligence tasks, such as sales analysis or customer segmentation. In some implementations, the tasks, tone, output fields, or other parameters can be determined based on user persona, which can be determined based on contextual information associated with a user (e.g., user role), a history of user interactions, or analysis of the user's input query 278. The platform can then prompt an AI model (such as GPT, BERT, T5, or custom transformer models) using any of the aforementioned elements to generate the SQL query 295 (or other query languages such as NoSQL, GraphQL, or SPARQL), which can be stored relationally to upvoting/downvoting feedback (as numerical scores, boolean values, or categorical ratings) received during the reinforcement learning process.

In some implementations, the semantic layer management engine 250 can perform data scaling by editing and adding new data and metadata. For example, the engine can dynamically expand database schemas by incorporating new table definitions from external data sources, such as adding customer behavioral data from web analytics platforms (such as Google Analytics, Adobe Analytics, or Mixpanel) or integrating IoT sensor data streams (using protocols such as MQTT, CoAP, or HTTP/REST APIs). The engine can also perform metadata enrichment by automatically generating column descriptions using natural language processing techniques (such as text summarization models, named entity recognition, or topic modeling), creating semantic relationships between data entities (using knowledge graphs, ontology mapping, or machine learning-based entity linking), and establishing data lineage mappings (using tools such as Apache Atlas, DataHub, or custom lineage tracking systems) that trace data flow from source systems through transformation pipelines. Additionally, the semantic layer management engine 250 can implement automated data quality assessment by analyzing statistical distributions (using statistical libraries such as SciPy, NumPy, or R), identifying anomalies in data patterns (using anomaly detection algorithms such as Isolation Forest, One-Class SVM, or autoencoders), and flagging potential inconsistencies across related datasets (using data profiling tools or custom validation rules).

In some implementations, the semantic layer management engine 250 can enable conversation history retention. The engine maintains persistent conversation threads by storing user interactions in a structured format (such as JSON, XML, or database records with relational schemas) that includes query timestamps (stored as Unix timestamps, ISO 8601 strings, or database datetime types), natural language inputs (as text strings with encoding such as UTF-8 or UTF-16), generated SQL queries (stored as text or parsed into abstract syntax trees), execution results (in formats such as JSON, CSV, or serialized objects), and user feedback scores (as numerical values, categorical labels, or boolean flags). This historical data is indexed using vector embeddings (generated using models such as Word2Vec, GloVe, BERT, or Sentence-BERT) to enable semantic similarity searches (using similarity metrics such as cosine similarity, Euclidean distance, or dot product), allowing the system to retrieve contextually relevant past conversations when users ask similar questions. For instance, if a user previously asked "What were our Q3 sales figures?" and later asks "Show me last quarter's revenue," the semantic layer management engine 250 can identify the semantic similarity and suggest or automatically apply similar query patterns. In some implementations, the conversation history also enables session continuity across multiple interaction channels (using session management techniques such as cookies, JWT tokens, or server-side session stores), enabling users to start a conversation via a web interface and continue it through a mobile application or Slack integration. The engine implements privacy-preserving techniques such as differential privacy (using algorithms such as Laplace mechanism or exponential mechanism) and data anonymization (using techniques such as k-anonymity, l-diversity, or t-closeness) to protect sensitive information while maintaining the utility of historical context for improving query accuracy and user experience.

In some implementations, the semantic layer management engine 250 can enable prompt augmentation (e.g., table prioritization, variable prioritization). The semantic layer management engine 250 can utilize intelligent ranking algorithms (such as TF-IDF, BM25, learning-to-rank models, or neural ranking architectures) that prioritize database tables and columns based on multiple factors including user access patterns (tracked through usage analytics and query logs), data freshness (measured by last update timestamps or data ingestion metrics), business criticality scores (assigned through manual curation or automated importance scoring), and semantic relevance to the current query context (computed using embedding similarity or keyword matching). For example, when a user asks about "customer satisfaction," the semantic layer management engine 250 can automatically prioritize tables containing survey data, support ticket information, and product review metrics over less relevant tables like inventory or shipping data. The prompt augmentation process can include dynamic context injection (using template engines or programmatic prompt construction), where the engine enriches user queries with relevant metadata such as table relationships (stored as foreign key constraints, join paths, or graph structures), common join patterns (derived from query history analysis or predefined templates), and business rule constraints (implemented as validation rules, check constraints, or custom logic).

In some implementations, the semantic layer management engine 250 can implement adaptive learning mechanisms that adjust prioritization weights based on user feedback and query success rates, using techniques like collaborative filtering (such as matrix factorization or neighborhood-based methods) and reinforcement learning (using algorithms such as Q-learning, policy gradients, or actor-critic methods). Additionally, the semantic layer management engine 250 can support domain-specific customization, allowing business units to configure their own prioritization rules (stored as configuration files, database settings, or user preferences), such as prioritizing financial tables for accounting users or customer data tables for marketing analysts.

In some implementations, the personalization engine 260 can perform user persona prediction, detection, or selection. The personalization engine 260 can utilize machine learning classification algorithms (such as logistic regression, random forest, support vector machines, or neural networks) to automatically identify user personas based on behavioral patterns (captured through clickstream data, interaction logs, or usage analytics), query history (stored as structured records with query text, timestamps, and metadata), role-based access controls (implemented using RBAC or ABAC systems), and organizational hierarchy data (stored in directory services such as Active Directory, LDAP, or HR systems). For instance, the personalization engine 260 can distinguish between a data scientist persona (characterized by complex analytical queries, statistical functions, and large dataset operations) and a business executive persona (focused on high-level KPIs, trend analysis, and summary reports).

In some implementations, the persona prediction, detection, or selection process incorporates contextual factors such as time of day (using temporal features or time-based rules), query complexity (measured by query length, number of joins, or computational complexity), or data domain (determined by table names, column types, or semantic categories) to dynamically adjust the user's active persona. The personalization engine 260 maintains persona profiles (stored as structured data in JSON, XML, or database records) that include preferred visualization types (such as charts, tables, or dashboards), common query patterns (stored as templates or frequent item sets), typical data granularity levels (such as daily, weekly, or monthly aggregations), and domain-specific terminology mappings (stored as dictionaries or ontology mappings).

In some implementations, personalization engine 260 uses neural network embeddings (generated using architectures such as autoencoders, variational autoencoders, or transformer models) to capture subtle persona characteristics and enable fine-grained personalization, such as adjusting query result formatting (using templating engines or custom formatters), suggesting relevant follow-up questions (using recommendation algorithms or rule-based systems), and customizing the conversational tone to match user preferences and expertise levels.

In some implementations, the personalization engine 260 can employ flexible conversational agents, which can ask follow-up questions in various ways, ask follow-up queries, converse in multiple languages, or provide suggestions for the user to correct or clarify the questions. These conversational agents utilize natural language generation models (such as GPT, T5, BART, or custom sequence-to-sequence models) trained on domain-specific corpora (such as business intelligence documentation, industry-specific texts, or conversational datasets) to produce contextually appropriate responses and clarifying questions. For example, when a user asks an ambiguous query such as "show me sales data," the agent might respond with structured follow-up questions such as "Which time period are you interested in?", "Would you like to see data by region, product category, or sales representative?", and "Are you looking for revenue figures, unit sales, or both?" The multilingual capabilities are powered by transformer-based translation models (such as mBERT, XLM-R, or specialized translation models like MarianMT) that maintain semantic consistency across languages while preserving business terminology and domain-specific concepts. The agents implement progressive disclosure techniques (using decision trees, state machines, or rule-based systems), starting with simple clarifying questions and gradually introducing more sophisticated options based on user responses and detected expertise levels.

In some implementations, the personalization engine 260 incorporates contextual suggestion engines (using recommendation algorithms, collaborative filtering, or content-based filtering) that analyze incomplete queries and provide auto-completion options (using trie structures, n-gram models, or neural language models), alternative phrasings (generated using paraphrasing models or synonym dictionaries), and related query templates (stored as parameterized templates or pattern libraries), while maintaining conversation flow through techniques like slot-filling (using named entity recognition or structured prediction models) and intent recognition (using classification models or rule-based intent parsers) to build comprehensive query understanding iteratively.

Semantic Layer Management Operations of the Conversational BI Platform

FIG. 3A is a flow diagram that illustrates example semantic layer management operations 300 of the conversational BI platform 100, in accordance with some implementations of the present technology. Operations 300 can be performed or caused to be performed by one or more non-transitory, computer-readable storage media comprising instructions recorded thereon, wherein the instructions, when executed by at least one data processor of a computing system, cause the computing system to maintain a semantic layer for a conversational business intelligence platform.

At 310, operations 300 include generating a first set of tokens. The first set of tokens can be generated by processing a natural language input, by accessing a data store, by accessing a configuration file, by receiving an API message, by executing an AI model, or via other suitable operations.

At 320, operations 300 include generating a semantic layer knowledge data store. In some implementations, the data store can include a table definition (e.g., a database schema). In some aspects, the techniques described herein include determining the table definition by accessing an ontology, wherein the ontology cross-references a set of data objects to a set of natural-language identifiers, and wherein the ontology includes a knowledge graph, a data model, an application programming interface (API), or a database. In some implementations, the data store can include a variable definition (e.g., a data object definition, such as a column identifier, a table identifier, metadata, data types, snippet of an executable code, and so forth). In some implementations, the data store can include an aggregation context. The aggregation context can include a classification set generated based on the first set of tokens. The classification set can represent various classifiers that can be utilized for selecting items (e.g., deterministically identified classifiers, stored classifiers, user-entered classifiers, AI-generated classifiers) for that can serve as building blocks or seed values (inputs) for generating differentiated code units. One example of such a classifier is a user persona.

At 330, operations 300 include dynamically modifying the aggregation context based on one more more of: (i) a second set of tokens generated based on additional natural language input, or (ii) contextual information associated with the additional natural language input. For example, the platform can receive a natural-language query that can cause the platform to update query history, user persona predictions, or other items that can serve as building blocks or seed values (inputs) for generating differentiated code units. For example, if a user queries "What were the total sales in Chicago last quarter?" the platform can update the table definition, variable definition, or aggregation context (e.g., by adding a new record) to enable generation of code units structured to execute queries that include "Chicago" as a geographic filter and "last quarter" as a time-based filter.

At 340, operations 300 include indexing at least a portion of the table definition and at least a portion of the variable definition against the aggregation context. For example, the new record added at 330 can be indexed based on the value (e.g., numerical value, ordinal value, semantic value) of a classifier associated with the user (e.g., user persona), ranked, and so forth.

In some aspects, the techniques described herein include receiving a natural language query including the additional natural language input; generating the second set of tokens by parsing the natural language query; using at least a portion of the second set of tokens to generate a query classification; and validating the query classification against the contextual information, wherein the contextual information is indicative of a user persona.

In some aspects, the techniques described herein include generating or updating the variable definition by storing a pair of data object identifiers associatively with an entity linking clause, wherein the entity linking clause is dynamically modifiable based on the additional natural language input. In some aspects, the entity linking clause relates to associatively linking data objects and includes a join operation, a merge operation, a combine operation, a filter operation, a map operation, or an include operation.

In some aspects, the techniques described herein include using an index to select a particular table definition; applying a generative artificial intelligence model to generate a code unit using the selected table definition, the code unit including a particular variable definition; and relationally storing the particular table definition and the particular variable definition.

In some aspects, the techniques described herein include caching at least a portion of the semantic layer knowledge data store based on one or more of: (i) a frequency of access to the table definition, (ii) a recency of access to the variable definition, (iii) or indexing information determined based on the aggregation context.

In some aspects, the techniques described herein include determining a rank associated with at least a portion of the aggregation context using a data freshness metric associated with a particular persona indicated by the aggregation context; and indexing at least a portion of the table definition and at least a portion of the variable definition based on the rank.

Code Unit Personalization Operations of the Conversational BI Platform

FIG. 3B is a flow diagram that illustrates example code unit personalization operations 350 of the conversational BI platform 100, in accordance with some implementations of the present technology. Operations 350 can be performed or caused to be performed by one or more non-transitory, computer-readable storage media comprising instructions recorded thereon, wherein the instructions, when executed by at least one data processor of a computing system, cause the computing system to enable incremental training of an artificial intelligence model structured to generate personalized code units, the artificial intelligence model comprising a set of memory units and activation functions linking memory units in the set of memory units updatable to improve generated code unit accuracy.

At 355, the operations 350 include receiving a natural language query (e.g., via the user interface engine 120). In some implementations, the natural language query can be selected by a user from a list of query suggestions generated by the platform based on user interaction history, user input, or other factors.

At 360, the operations 350 include determining a user persona based on contextual information regarding a user associated with the natural language query, the contextual information comprising at least one of: (i) user role information, or (ii) historical interaction pattern information for the user or other similar users. The contextual information can be included in or determined based on session metadata associated with the natural-language query, request metadata, query metadata, computing device metadata, and so forth. Determining the user persona can further include using query history associated with the user to generate a prediction regarding one or more of a data domain preference, a visualization type preference, or a query complexity preference of the user. These operations can include applying a trained machine learning classification model to the data domain preference, the visualization type preference, or the query complexity preference of the user to generate a classifier. The user persona can be determined using the classifier. For example, a group of classifiers for a set of query complexity preferences can be linked to a particular persona (e.g., "data engineer" for comparatively more technically complex queries). In some implementations, based on the detected user persona, the techniques can include applying compute logic to the generated result set, the compute logic including a data aggregation operation, a summarization operation, execution of an additional code unit, or applying a highlighting schema to the generated result set.

At 365, the operations 350 include, responsive to determining that at least a portion of the natural language query matches an ontology (e.g., data store) entry (e.g., table description 171, variable description 172, domain ontology 151), and retrieving a corresponding code unit associated with the ontology entry, wherein the code unit is identified based on the determined user persona.

At 370, the operations 350 include, responsive to determining that at least a portion of the natural language query does not match an ontology entry, applying the artificial intelligence model to generate the code unit by prompting the artificial intelligence model with the at least a portion of the natural language query and at least two of: (i) the user role information, (ii) the historical interaction pattern information, or (iii) the determined user persona.

At 375, the operations 350 include executing the code unit against a data source to generate a result set. In some implementations, the code unit includes a data selection statement, an entity linking clause, a result set filtering clause, or a result set organization clause.

At 380, the operations 350 include, responsive to detecting a feedback item in connection with the result set or the code unit, incrementally training the artificial intelligence model using the detected feedback item, wherein incrementally training the artificial intelligence model comprises causing the artificial intelligence model to update, responsive to the detected feedback item, the set of memory units and the activation functions linking the memory units in the set of memory units. In some implementations, the techniques described herein include, responsive to determining that a number of upvotes (or other positive feedback units) relating to the code unit meets or exceeds a predetermined threshold, adding the code unit to the ontology in association with the user persona. In some implementations, the techniques described herein include causing the system to prioritize persona-relevant code units by performing similarity matching using retrieval-augmented generation to identify a semantic relationship between at least a portion of the natural language query and the ontology entry and weighting the similarity matching based on the determined user persona. In some implementations, the techniques described herein include, responsive to detecting an additional feedback item including a modification to the code unit, updating the ontology entry to store the modification to the code unit.

Example Computing Environment

FIG. 4 is a system diagram illustrating an example of a computing environment in which the disclosed system operates in some implementations. In some implementations, environment 400 includes one or more client computing devices 405A-D, examples of which can host the conversational BI platform 100 of FIGS. 1 and 2A. Client computing devices 405 operate in a networked environment using logical connections through network 430 to one or more remote computers, such as a server computing device.

In some implementations, server 410 is an edge server which receives client requests and coordinates fulfillment of those requests through other servers, such as servers 420A-C. In some implementations, servers 410 and 420, or associated computing devices, comprise computing systems, such as the conversational BI platform 100 of FIGS. 1 and 2A. Though each server 410 and 420, or associated computing device, is displayed logically as a single server, server computing devices can each be a distributed computing environment encompassing multiple computing devices located at the same or at geographically disparate physical locations. In some implementations, each server 420 corresponds to a group of servers.

Client computing devices 405 and servers 410 and 420, or associated computing devices, can each act as a server or client to other server or client devices. In some implementations, servers (410, 420A-C) connect to a corresponding database (415, 425A-C). As discussed above, each server 420 can correspond to a group of servers, and each of these servers can share a database or can have its own database. Databases 415 and 425 warehouse (e.g., store) information such as queries, insights, history, charts, dashboards, user persona information, ontologies, variable descriptions, embeddings, vectors, indexes, training information (inputs, outputs, validation information such as scores, upvotes, downvotes), thresholds, and the like. Though databases 415 and 425 are displayed logically as single units, databases 415 and 425 can each be a distributed computing environment encompassing multiple computing devices, can be located within their corresponding server, or can be located at the same or at geographically disparate physical locations.

Network 430 can be a local area network (LAN) or a wide area network (WAN) but can also be other wired or wireless networks. In some implementations, network 430 is the Internet or some other public or private network. Client computing devices 405 are connected to network 430 through a network interface, such as by wired or wireless communication. While the connections between server 410 and servers 420 are shown as separate connections, these connections can be any kind of local, wide area, wired, or wireless network, including network 430 or a separate public or private network.

Example Machine Learning Architecture

Figure 5:
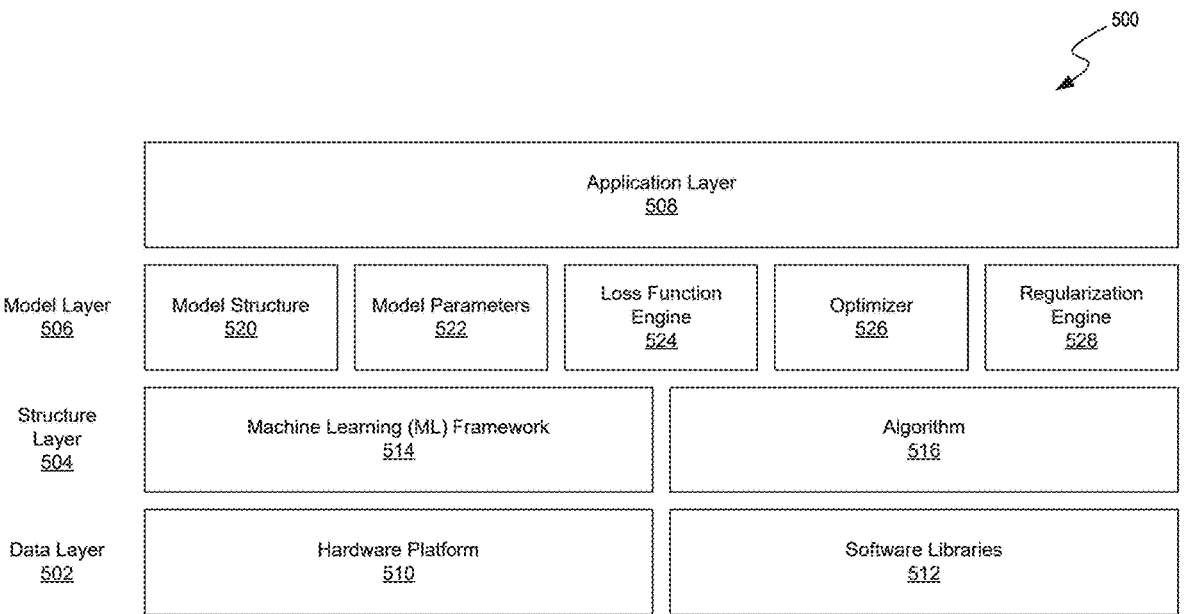
FIG. 5 illustrates a layered architecture of an artificial intelligence (AI) system that can implement the AI/ML models of the conversational BI platform in accordance with some implementations of the present technology.

FIG. 5 illustrates a layered architecture of an artificial intelligence (AI) system 500 that can implement the AI/ML models of conversational BI platform 100 of FIGS. 1 and 2A, in accordance with some implementations of the present technology. Example AI/ML models can include one or more executable algorithms stored at computing databases 415, 425 and/or retrieved from external service providers (e.g., a third-party cloud host) via the network 430 of the example computing environment 400. Accordingly, the computing environment 400 and/or components thereof (e.g., servers 410, 420, databases 415, 425, network 430, and/or the like) can include, or be incorporated within, one or more components of the AI system 500. The AI system 500 provides a comprehensive software stack capable of hosting suitable runtime environments for one or more operations of AI/ML models, as further described herein.

As shown, the AI system 500 can include a set of layers, which conceptually organize elements within an example network topology for the AI system's architecture to implement a particular AI model. Generally, an AI model is a computer-executable program implemented by the AI system 500 that analyses input data to generate inferential output data (e.g., a classification label for input feature vectors). Information can pass through each layer of the AI system 500 to generate outputs for the AI model. The layers can include a data layer 502, a structure layer 504, a model layer 506, and an application layer 508. The algorithm 516 of the structure layer 504 and the model structure 520 and model parameters 522 of the model layer 506 together form an example AI model. The optimizer 526, loss function engine 524, and regularization engine 528 work to refine and optimize the AI model, and the data layer 502 provides resources and support for application of the AI model by the application layer 508.

The data layer 502 acts as the foundation of the AI system 500 by preparing data for the AI model. As shown, the data layer 502 can include two sub-layers: a hardware platform 510 and one or more software libraries 512. The hardware platform 510 can be designed to perform operations for the AI model and include computing resources for storage, memory, logic and networking, such as the resources described in relation to FIGS. 4 and 7. The hardware platform 510 can process amounts of data using one or more servers. The servers can perform backend operations such as matrix calculations, parallel calculations, machine learning (ML) training, and the like. Examples of servers used by the hardware platform 510 include central processing units (CPUs) (such as Intel x86, AMD64, or ARM processors) and graphics processing units (GPUs) (such as NVIDIA Tesla, AMD Radeon, or Intel Xe architectures). CPUs are electronic circuitry designed to execute instructions for computer programs, such as arithmetic, logic, controlling, and input/output (I/O) operations, and can be implemented on integrated circuit (IC) microprocessors, such as application specific integrated circuits (ASIC) (or field-programmable gate arrays (FPGAs) or tensor processing units (TPUs)). GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 510 can include computing resources, (e.g., servers, memory, etc.) offered by a cloud services provider (such as AWS, Azure, Google Cloud Platform, or specialized AI cloud providers). The hardware platform 510 can also include computer memory for storing data about the AI model, application of the AI model, and training data for the AI model. The computer memory can be a form of random-access memory (RAM), such as dynamic RAM (DRAM), static RAM (SRAM), and non-volatile RAM (NVRAM or flash memory).

The software libraries 512 can be thought of as suites of data and programming code, including executables, used to control the computing resources of the hardware platform 510. The programming code can include low-level primitives (e.g., fundamental language elements) that form the foundation of one or more low-level programming languages (such as C, C++, Assembly, or CUDA), such that servers of the hardware platform 510 can use the low-level primitives to carry out specific operations. The low-level programming languages do not require much, if any, abstraction from a computing resource's instruction set architecture, allowing them to run quickly with a small memory footprint. Examples of software libraries 512 that can be included in the AI system 500 include INTEL Math Kernel Library (MKL), NVIDIA cuDNN (CUDA Deep Neural Network library), EIGEN (a C++ template library for linear algebra), and OpenBLAS (an optimized BLAS library).

The structure layer 504 can include an AI/ML framework 514 and an algorithm 516. The AI/ML framework 514 can be thought of as an interface, library, or tool that allows users to build and deploy the AI model. The AI/ML framework 514 can include an open-source library (such as TensorFlow, PyTorch, or scikit-learn), an application programming interface (API) (such as REST APIs, GraphQL, or gRPC interfaces), a gradient-boosting library (such as XGBoost, LightGBM, or CatBoost), an ensemble method (such as Random Forest, AdaBoost, or Voting Classifiers), and/or a deep learning toolkit (such as Keras, PyTorch Lightning, or Hugging Face Transformers) that work with the layers of the AI system facilitate development of the AI model. For example, the AI/ML framework 514 can distribute processes for application or training of the AI model across multiple resources in the hardware platform 510. The AI/ML framework 514 can also include a set of pre-built components that have the functionality to implement and train the AI model and allow users to use pre-built functions and classes to construct and train the AI model. Thus, the AI/ML framework 514 can be used to facilitate data engineering (using tools such as Apache Spark, Pandas, or Dask), development (using IDEs such as Jupyter Notebooks, PyCharm, or VS Code), hyperparameter tuning (using libraries such as Optuna, Hyperopt, or Ray Tune), testing (using frameworks such as pytest, unittest, or MLflow), and training (using distributed training frameworks such as Horovod, DeepSpeed, or FairScale) for the AI model. Examples of AI/ML frameworks 514 that can be used in the AI system 500 include TENSORFLOW (Google's open-source machine learning framework), PYTORCH (Facebook's deep learning framework), SCIKIT-LEARN (a Python machine learning library), KERAS (a high-level neural networks API), LightGBM (Microsoft's gradient boosting framework), RANDOM FOREST (an ensemble learning method), and AMAZON WEB SERVICES (cloud-based ML services such as SageMaker).

The algorithm 516 can be an organized set of computer-executable operations used to generate output data from a set of input data and can be described using pseudocode (or implemented in programming languages such as Python, R, Java, or C++). The algorithm 516 can include complex code that allows the computing resources to learn from new input data and create new/modified outputs based on what was learned. In some implementations, the algorithm 516 can build the AI model through being trained while running computing resources of the hardware platform 510. This training allows the algorithm 516 to make predictions or decisions without being explicitly programmed to do so. Once trained, the algorithm 516 can run at the computing resources as part of the AI model to make predictions or decisions, improve computing resource performance, or perform tasks. The algorithm 516 can be trained using supervised learning (with labeled datasets), unsupervised learning (with unlabeled data for pattern discovery), semi-supervised learning (combining labeled and unlabeled data), and/or reinforcement learning (learning through interaction with an environment).

Using supervised learning, the algorithm 516 can be trained to learn patterns (e.g., map input data to output data) based on labeled training data. The training data may be labeled by an external user or operator (or through automated labeling systems, crowdsourcing platforms, or weak supervision techniques). For instance, a user may collect a set of training data, such as by capturing data from sensors (IoT devices, environmental sensors, or industrial equipment), images from a camera (digital cameras, smartphones, or surveillance systems), outputs from a model (predictions, classifications, or generated content), and the like. Furthermore, training data can include queries, insights, history, charts, dashboards, user persona information, ontologies, variable descriptions, embeddings, vectors, indexes, training information (inputs, outputs, validation information such as scores, upvotes, downvotes), thresholds, and/or other data, such as the data described in connection with the conversational BI platform 100. The user may label the training data based on one or more classes (categorical labels, numerical targets, or multi-label classifications) and trains the AI model by inputting the training data into the algorithm 516. The algorithm determines how to label the new data based on the labeled training data. The user can facilitate collection, labeling, and/or input via the AI/ML framework 514. In some instances, the user may convert the training data to a set of feature vectors (numerical representations, embeddings, or engineered features) for input to the algorithm 516. Once trained, the user can test the algorithm 516 on new data to determine if the algorithm 516 is predicting accurate labels for the new data. For example, the user can use cross-validation methods (k-fold, stratified, or time series cross-validation) to test the accuracy of the algorithm 516 and retrain the algorithm 516 on new training data if the results of the cross-validation are below an accuracy threshold.

Supervised learning can involve classification and/or regression. Classification techniques involve teaching the algorithm 516 to identify a category of new observations based on training data and are used when input data for the algorithm 516 is discrete. Said differently, when learning through classification techniques, the algorithm 516 receives training data labeled with user persona information, such as demographics (age, gender, location, education level), preferences (product categories, communication channels, content types), search history (query logs, click-through data, session information), and behavior patterns (usage frequency, interaction duration, feature utilization), and determines how features observed in the training data relate to recognizing personas and generating query snippets, including constructing query clauses such as "where" and "having" to filter and refine search results, allowing the system to more accurately identify personas and create relevant query snippets that meet specific user needs. For example, a business user in insurance claims analytics may have a search history that includes topics like "dashboard generation for claims analytics," "insurance claims trends," and "risk assessment models." The user's natural language question "What are the top 5 most common claims in the past quarter?" might translate to a query (in SQL, NoSQL, or other query languages) such as "SELECT claim_type, COUNT(*) FROM claims WHERE claim_date> NOW( )–INTERVAL 3 MONTH GROUP BY claim_type ORDER BY COUNT(*) DESC LIMIT 5." The user's persona as a business analyst might be identified from labels associated with their user account information, such as "role: business analyst" or "industry: insurance." The conversational BI platform 100 might, additionally or alternatively, infer the user's persona from questions they've asked, such as "How can I optimize my claims processing workflow?" or "What are the key performance indicators for insurance claims?" Such automatic inferences can be based on keyword analysis (using TF-IDF, word embeddings, or named entity recognition), intent detection (using classification models or rule-based systems), or AI/ML models trained on user behavior data (using neural networks, decision trees, or ensemble methods). The conversational BI platform 100 can then use this inferred persona to generate more relevant query snippets. For example, the user's persona might influence the system's generation of query snippets, such as adding a "WHERE" clause to filter results by the user's specific region or department. Once trained, the algorithm 516 can categorize new data by analyzing the new data for features that map to the categories. Examples of classification techniques include boosting (AdaBoost, Gradient Boosting, XGBoost), decision tree learning (CART, C4.5, Random Forest), genetic programming (evolutionary algorithms for program synthesis), learning vector quantization (LVQ, a neural network-based method), k-nearest neighbor (k-NN) algorithm (distance-based classification), and statistical classification (logistic regression, naive Bayes, support vector machines).

Regression techniques involve estimating relationships between independent and dependent variables and are used when input data to the algorithm 516 is continuous. Regression techniques can be used to train the algorithm 516 to predict or forecast relationships between variables. To train the algorithm 516 using regression techniques, a user can select a regression method for estimating the parameters of the model. The user collects and labels training data that is input to the algorithm 516 such that the algorithm 516 is trained to understand the relationship between data features and the dependent variable(s). Once trained, the algorithm 516 can predict missing historic data or future outcomes based on input data. Examples of regression methods include linear regression (simple and multiple linear regression), multiple linear regression (with multiple independent variables), logistic regression (for binary or categorical outcomes), regression tree analysis (decision trees for regression), least squares method (ordinary least squares, weighted least squares), and gradient descent (optimization algorithm for parameter estimation). In an example implementation, regression techniques can be used, for example, to estimate and fill-in missing data for machine-learning based pre-processing operations.

Under unsupervised learning, the algorithm 516 learns patterns from unlabeled training data. In particular, the algorithm 516 is trained to learn hidden patterns and insights of input data, which can be used for data exploration or for generating new data. Here, the algorithm 516 does not have a predefined output, unlike the labels output when the algorithm 516 is trained using supervised learning. Said another way, unsupervised learning is used to train the algorithm 516 to find an underlying structure of a set of data, group the data according to similarities, and represent that set of data in a compressed format.

A few techniques can be used in unsupervised learning: clustering, anomaly detection, and techniques for learning latent variable models. Clustering techniques involve grouping data into different clusters that include similar data, such that other clusters contain dissimilar data. For example, during clustering, data with possible similarities remains in a group that has less or no similarities to another group. Examples of clustering techniques density-based methods include density-based methods (such as DBSCAN or OPTICS), hierarchical based methods (such as agglomerative or divisive clustering), partitioning methods (such as k-means or k-medoids), and grid-based methods (such as STING or CLIQUE). In one example, the algorithm 516 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 516 may be trained to be an Isolation Forest (an ensemble method for anomaly detection), local outlier factor (LOF) algorithm (density-based anomaly detection), or K-nearest neighbor (k-NN) algorithm (distance-based anomaly detection). Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 516 include factor analysis (dimensionality reduction technique), item response theory (psychometric modeling), latent profile analysis (mixture modeling for continuous variables), and latent class analysis (mixture modeling for categorical variables).

Instead of or in addition to supervised and unsupervised learning, the algorithm 516 can also be trained using reinforcement learning, where the model learns to take actions to maximize a reward signal (using techniques such as Q-learning, policy gradients, or actor-critic methods). For instance, the algorithm 516 can be trained to optimize query generation based on user feedback, such as clicks or ratings (stored as numerical scores, boolean values, or categorical labels), to refine its understanding of user preferences and generate more accurate query snippets. For example, the platform can generate a SQL query (or other query types such as NoSQL, GraphQL, or SPARQL) by automatically determining the user persona and translating a natural language question to a SQL query. A human-in-the-loop can then upvote or downvote the generated query (through UI controls, API calls, or feedback forms) based on its relevance and accuracy. If the cumulative reward score falls below a certain threshold (e.g., a predetermined ratio of upvotes to total votes, a percentage, etc. represented as floating-point numbers or normalized scores) the reinforcement learning model adjusts the weights of its activation functions using techniques such as Q-learning (value-based reinforcement learning) or policy gradient methods (such as REINFORCE, PPO, or A3C) to generate a more accurate query. By incorporating reinforcement learning, the algorithm 516 can adapt to changing user behavior and improve its performance over time. Techniques such as deep Q-networks (DQN) (combining Q-learning with deep neural networks) can be employed to train the algorithm 516 in a reinforcement learning framework.

The model layer 506 implements the AI model using data from the data layer and the algorithm 516 and AI/ML framework 514 from the structure layer 504, thus enabling decision-making capabilities of the AI system 500. The model layer 506 includes a model structure 520, model parameters 522, a loss function engine 524, an optimizer 526, and a regularization engine 528.

The model structure 520 describes the architecture of the AI model of the AI system 500. The model structure 520 defines the complexity of the pattern/relationship that the AI model expresses. Examples of structures that can be used as the model structure 520 include decision trees (CART, C4.5, Random Forest), support vector machines (SVM with various kernels), regression analyses (linear, logistic, polynomial regression), Bayesian networks (probabilistic graphical models), Gaussian processes (non-parametric Bayesian models), genetic algorithms (evolutionary optimization), and artificial neural networks (feedforward, convolutional, recurrent networks) (or, simply, neural networks). The model structure 520 can include a number of structure layers, a number of nodes (or neurons) at each structure layer, and activation functions (such as ReLU, sigmoid, tanh, or softmax) of each node. Each node's activation function defines how to node converts data received to data output. The structure layers may include an input layer of nodes that receive input data, an output layer of nodes that produce output data. The model structure 520 may include one or more hidden layers of nodes between the input and output layers. The model structure 520 can be an Artificial Neural Network (or, simply, neural network) that connects the nodes in the structured layers such that the nodes are interconnected. Examples of neural networks include Feedforward Neural Networks (multilayer perceptrons), convolutional neural networks (CNNs) (for image and spatial data processing), Recurrent Neural Networks (RNNs) (including LSTM and GRU variants), Autoencoders (for dimensionality reduction and feature learning), and Generative Adversarial Networks (GANs) (for generative modeling).

The model parameters 522 represent the relationships learned during training and can be used to make predictions and decisions based on input data. The model parameters 522 can weight and bias the nodes and connections of the model structure 520. For instance, when the model structure 520 is a neural network, the model parameters 522 can weight and bias the nodes in each layer of the neural networks, such that the weights (typically represented as floating-point numbers or matrices) determine the strength of the nodes and the biases (scalar values added to weighted inputs) determine the thresholds for the activation functions of each node. The model parameters 522, in conjunction with the activation functions of the nodes, determine how input data is transformed into desired outputs. The model parameters 522 can be determined and/or altered during training of the algorithm 516.

The loss function engine 524 can determine a loss function, which is a metric used to evaluate the AI model's performance during training. For instance, the loss function engine 524 can measure the difference between a predicted output of the AI model and the actual output of the AI model and is used to guide optimization of the AI model during training to minimize the loss function. The loss function may be presented via the AI/ML framework 514, such that a user can determine whether to retrain or otherwise alter the algorithm 516 if the loss function is over a threshold. In some instances, the algorithm 516 can be retrained automatically if the loss function is over the threshold. Examples of loss functions include a binary-cross entropy function (for binary classification), hinge loss function (for support vector machines), regression loss function (e.g., mean square error (MSE), quadratic loss, etc.), mean absolute error function (MAE), smooth mean absolute error function (Huber loss), log-cosh loss function (smooth approximation of MAE), and quantile loss function (for quantile regression).

The optimizer 526 adjusts the model parameters 522 to minimize the loss function during training of the algorithm 516. In other words, the optimizer 526 uses the loss function generated by the loss function engine 524 as a guide to determine what model parameters lead to the most accurate AI model. Examples of optimizers include Gradient Descent (GD) (batch, stochastic, mini-batch variants), Adaptive Gradient Algorithm (AdaGrad) (adaptive learning rate optimization), Adaptive Moment Estimation (Adam) (combining momentum and adaptive learning rates), Root Mean Square Propagation (RMSprop) (adaptive learning rate method), Radial Base Function (RBF) (for neural network training) and Limited-memory BFGS (L-BFGS) (quasi-Newton optimization method). The type of optimizer 526 used may be determined based on the type of model structure 520 and the size of data and the computing resources available in the data layer 502.

The regularization engine 528 executes regularization operations. Regularization is a technique that prevents over- and under-fitting of the AI model. Overfitting occurs when the algorithm 516 is overly complex and too adapted to the training data, which can result in poor performance of the AI model. Underfitting occurs when the algorithm 516 is unable to recognize even basic patterns from the training data such that it cannot perform well on training data or on validation data. The optimizer 526 regularization engine 528 can apply one or more regularization techniques to fit the algorithm 516 to the training data properly, which helps constraint the resulting AI model and improves its ability for generalized application. Examples of regularization techniques include lasso (L1) regularization (promoting sparsity in model parameters), ridge (L2) regularization (penalizing large parameter values), and elastic (L1 and L2 regularization) net regularization (combining L1 and L2 penalties).

The application layer 508 describes how the AI system 500 is used to solve problems or perform tasks. In an example implementation, the application layer 508 can be communicatively coupled to an interactable user interface of the conversational BI platform 100, providing a suite of business intelligence tools, including interactive dashboards with drill-down capabilities, data visualizations (charts, graphs, heatmaps, or interactive plots), and real-time analytics. In some implementations, users can engage with the platform through a chatbot interface (web-based, mobile app, or messaging platform integration), asking questions in natural language and receiving query results, data visualizations, or alerts in response. In some implementations, the conversational BI platform 100 can include a user interface having a search bar interface (with autocomplete, suggestions, or advanced search filters) where users can input queries and receive relevant results, filtered by relevance, date, or other criteria. Additionally, the conversational BI platform 100 can include a dashboard builder interface (drag-and-drop, template-based, or code-based), allowing users to create custom dashboards with drag-and-drop tools, interactive visualizations, and real-time data updates. In some implementations, the conversational BI platform 100 can function to enable users to set up automated reporting and notification systems (email reports, SMS alerts, or push notifications), ensuring timely insights and data-driven decision-making. In some implementations, the conversational BI platform 100 can integrate with communication tools, such as Slack or Microsoft Teams (or other collaboration platforms such as Discord, Zoom, or Google Workspace), to provide conversational BI capabilities within these applications, facilitating seamless collaboration and decision-making.

Example Transformer for Code-Generating Machine Learning Models

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") represented as floating-point numbers or matrices) whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections (recurrent connections), skip connections (residual connections), and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs) (for image and spatial data processing), recurrent neural networks (RNNs) (for sequential data processing), multilayer perceptrons (MLPs) (feedforward neural networks), Generative Adversarial Networks (GANs) (for generative modeling), Variational Autoencoders (VAEs) (for probabilistic generative modeling), and Auto-regressive Models (for sequential prediction), among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights stored as numerical arrays or tensors) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus) (stored in formats such as plain text, JSON, XML, or structured databases). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages (using web scraping tools or APIs) and/or publicly available social media posts (from platforms such as Twitter, Reddit, or Facebook). Training data may be annotated with ground truth labels (categorical labels, numerical targets, or structured annotations) (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder for unsupervised learning), or can be a measure of some target observable effect on the environment (e.g., in the case of a reinforcement learning agent interacting with a simulated or real environment). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward represented as numerical values) in order to bring the output value as close to the target value as possible. The goal of training the ML model typically is to minimize a loss function or maximize a reward function.

The training data may be a subset of a larger data set. For example, a data set may be split into three mutually exclusive subsets: a training set (typically 60-80% of the data), a validation (or cross-validation) set (typically 10-20% of the data), and a testing set (typically 10-20% of the data). The three subsets of data may be used sequentially during ML model training. For example, the training set may be first used to train one or more AI/ML models, each ML model, e.g., having a particular architecture (neural network topology, layer types, activation functions), having a particular training procedure (optimization algorithm, learning rate schedule, batch size), being describable by a set of model hyperparameters (learning rate, regularization strength, network depth), and/or otherwise being varied from the other of the one or more AI/ML models. The validation (or cross-validation) set may then be used as input data into the trained AI/ML models to, e.g., measure the performance of the trained AI/ML models and/or compare performance between them. Where hyperparameters are used, a new set of hyperparameters may be determined based on the measured performance of one or more of the trained AI/ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more AI/ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model (using chain rule of calculus), and a gradient algorithm (e.g., gradient descent or its variants such as Adam, RMSprop, or AdaGrad) is used to update (i.e., "learn") the parameters to reduce the loss function. Backpropagation is performed iteratively so that the loss function is converged or minimized. Other techniques for learning the parameters of the ML model may be used (such as evolutionary algorithms, Bayesian optimization, or reinforcement learning). The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value within a specified tolerance), after which the ML model is considered to be sufficiently trained. The values of the learned parameters may then be fixed and the ML model may be deployed to generate output in real-world applications (also referred to as "inference" or prediction phase).

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly-available text corpora may be, e.g., fine-tuned by further training using specific training samples (domain-specific datasets, task-specific examples, or user-generated content). The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models (such as n-gram models or rule-based systems). In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities (computed using statistical methods or neural networks). A language model may contain hundreds of thousands of learned parameters or in the case of a large language model (LLM) may contain millions or billions of learned parameters or more (stored as floating-point numbers in model files or distributed across multiple devices). As non-limiting examples, a language model can generate text (creative writing, technical documentation, or conversational responses), translate text (between different languages using neural machine translation), summarize text (extractive or abstractive summarization), answer questions (factual, reasoning, or conversational Q&A), write code (e.g., SQL (Structured Query Language), Python (high-level programming language), JavaScript (web programming language), or other programming languages such as Java, C++, Go, or Rust), classify text (sentiment analysis, topic classification, or intent recognition) (e.g., to identify spam emails), create content for various purposes (e.g., social media content, factual content, or marketing content), or create personalized content for a particular individual or group of individuals.

Language models can also be used for chatbots (customer service, virtual assistants, or conversational AI) (e.g., virtual assistants).

In recent years, there has been interest in a type of neural network architecture, referred to as a transformer, for use as language models. For example, the Bidirectional Encoder Representations from Transformers (BERT) model (Google's transformer-based model), the Transformer-XL model (extended context transformer), and the Generative Pre-trained Transformer (GPT) models (OpenAI's autoregressive language models) are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models (including LSTM and GRU variants).

FIG. 6 is a block diagram of an example transformer 612 that can implement aspects of the present technology. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence (using attention weights computed through query, key, and value matrices). Although transformer-based language models are described herein, it should be understood that the present disclosure may be applicable to any AI/ML-based language model, including language models based on other neural network architectures such as recurrent neural network (RNN)-based language models.

The transformer 612 includes an encoder 608 (which can comprise one or more encoder layers/blocks connected in series) and a decoder 610 (which can comprise one or more decoder layers/blocks connected in series). Generally, the encoder 608 and the decoder 610 each include a plurality of neural network layers, at least one of which can be a self-attention layer (multi-head attention mechanism). The parameters of the neural network layers can be referred to as the parameters of the language model. The transformer 612 can be trained to perform certain functions on a natural language input. For example, the functions include summarizing existing content (extractive or abstractive summarization), brainstorming ideas (creative ideation or problem-solving), writing a rough draft (content generation in various formats), fixing spelling and grammar (text correction and proofreading), translating content (multilingual translation), and code generation (programming in various languages). Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages (using neural machine translation models). In some embodiments, the transformer 612 is trained to perform certain functions on other input formats than natural language input. For example, the input can include objects (structured data representations), images (visual data processed through computer vision), audio content (speech or music processed through audio processing), or video content (temporal visual data), or a combination thereof.

Code generation can involve creating executable code snippets based on natural language input, such as generating a function or a class in a specific programming language (Python, Java, JavaScript, C++, or SQL). For instance, given the input "create a function that takes a list of numbers and returns the average," the transformer 612 can generate the requested function (in the specified programming language with appropriate syntax). The generated code can then be fine-tuned or modified by the user to suit their specific needs. The transformer 612 can also generate code for data processing (ETL pipelines, data cleaning, or analysis scripts), machine learning (model training, evaluation, or deployment code), web development (HTML, CSS, JavaScript, or backend code), and other applications.

The transformer 612 can be trained on a corpus (e.g., a text corpus, a code corpus containing programming languages and documentation) that is labeled (e.g., annotated to indicate verbs, nouns, code elements (functions, variables, classes), keywords (reserved words in programming languages), commands (executable instructions), syntax structures (grammatical or code structure annotations)) or unlabeled. Large language models (LLMs) can be trained on a large unlabeled corpus (using unsupervised learning techniques). The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 6 illustrates an example of how the transformer 612 can process natural language input data and generate SQL code (or code units in other query languages such as NoSQL, GraphQL, or SPARQL). Input to the transformer 612 can include natural language questions or queries that users want to ask a database (relational, NoSQL, or graph databases). The transformer 612 can translate these natural language inputs into SQL queries (or other appropriate query languages) that can be executed on a database. For example, the natural language input can be tokenized into a sequence of tokens 602 (using tokenization algorithms such as BPE, WordPiece, or SentencePiece), which are then converted into embedding vectors 606 (dense numerical representations typically 256-1024 dimensions). These embedding vectors capture the semantic meaning of the natural language input and are used by the encoder 608 to generate feature vectors 614 (contextual representations of the input). The decoder 610 takes the feature vectors 614 as input and generates a sequence of SQL tokens 616 (keywords, identifiers, operators, and literals) that form a SQL query. The decoder 610 can generate SQL keywords (SELECT, FROM, WHERE, JOIN), table names (database table identifiers), and column names (database column identifiers) based on the context and semantics of the natural language input. For example, if the natural language input is "What is the average salary of employees in the sales department?", the transformer 612 can generate the following SQL query (or equivalent in other query languages): "SELECT AVG (salary) FROM employees WHERE department='Sales". In this example, the transformer 612 has translated the natural language question into a SQL query that can be executed on a database to retrieve the desired information.

The transformer 612 can be configured or trained to generate SQL queries (or other database query languages) that are tailored to a specific database schema, wherein the generation is informed by the table and column names, data types (INTEGER, VARCHAR, DATE, BOOLEAN, etc.), and relationships between tables (foreign keys, joins, or graph relationships) encoded in the schema. This enables users to interact with the database using natural language inputs, without requiring knowledge of the underlying SQL syntax or database schema. In some examples, the transformer 612 can be fine-tuned on a specific database schema and dataset (using transfer learning or domain adaptation techniques) to improve its performance and accuracy in generating SQL queries, such as by minimizing a loss function that measures the difference between the generated SQL queries and a set of ground truth SQL queries (using metrics such as exact match accuracy, execution accuracy, or semantic similarity).

The transformer 612 can further use supplemental metadata, including table description data (stored in formats such as JSON, XML, or database catalogs), variable description data (column metadata with data types and constraints), and aggregation context data (common query patterns and business rules). Table description data can include database schema information such as table names, descriptions, and categorizations, as well as relationships between tables (e.g., data lineage information such as source system and data refresh frequency (batch schedules, real-time streaming, or manual updates), table-level tags or labels such as "PII" or "financial_data" (data classification and governance metadata), business rules or constraints such as unique customer_id (primary keys, foreign keys, or check constraints), and historical changes to the table schema (version control, schema evolution tracking)). Variable description data can include variable information such as column names, data types, and descriptions, as well as additional metadata such as data domain information (e.g., valid values or ranges for a column such as age between 0-120 or status in ('active', 'inactive', 'pending')), data quality metrics (e.g., nullability (percentage of null values), data distribution (statistical summaries, histograms, or outlier detection)), variable relationships (e.g., dependencies or correlations between columns computed using statistical methods or machine learning), and business rules or constraints that apply to specific columns (e.g., order_total must be greater than zero implemented as database check constraints or application-level validation). Aggregation context data can include information such as common aggregation operations (e.g., SUM, AVERAGE, COUNT as well as statistical functions like MEDIAN, PERCENTILE, or STDDEV), common query patterns or templates (e.g., top N customers by sales using ORDER BY and LIMIT clauses), derived metrics or calculated fields (e.g., customer lifetime value computed using business logic and formulas), data freshness requirements (e.g., sales data must be up-to-date within the last hour enforced through data pipeline monitoring), and query optimization hints (e.g., preferred join orders or indexing strategies for database query optimization).

By incorporating this metadata into the training process, the transformer 612 can generate SQL queries that are more accurate, relevant, and efficient for the specific use case. For example, the transformer 612 can use table description data to determine which tables to join (based on foreign key relationships or semantic similarity), use variable description data to infer the correct data type for a column (ensuring type compatibility in queries), and use aggregation context data to determine the most relevant aggregation operations to apply to a given query (based on business context and user intent). The transformer 612 can be used to generate SQL queries for a wide range of applications, including data analysis (exploratory data analysis, reporting), business intelligence (dashboards, KPI monitoring), and data science (feature engineering, model training data preparation).

The transformer 612 can be trained using a model-based reinforcement learning framework (using algorithms such as model-based policy optimization or Dyna-Q), where the model is optimized to generate SQL queries that maximize a reward function, which can be defined based on metrics such as query accuracy (exact match, execution success), execution time (query performance metrics), and relevance to the user's intent (semantic similarity, user satisfaction scores). These metrics can be computationally derived (e.g., by using static code analysis techniques (AST parsing, syntax validation), applying query optimization plans to the generated code (database query planners, cost estimation), and so forth) and/or provided by the human in the loop (e.g., in the form of upvotes, downvotes (binary feedback), ratings (numerical scores on a scale), code revisions (manual corrections or improvements), and/or revisions to metadata identifiers (updates to table or column descriptions)). During training, the transformer 612 receives natural language inputs and corresponding SQL queries (training pairs for supervised learning), as well as metadata that includes table description data, variable description data, and aggregation context data. The transformer 612 learns to effectively utilize this metadata to generate high-quality SQL queries by exploring the action space through policy gradient methods, such as REINFORCE (policy gradient algorithm) or actor-critic methods (combining value function approximation with policy optimization). The model is trained on a dataset of labeled examples, where the labels consist of ground-truth SQL queries (manually created or validated queries), and the reward function provides a signal to the model to generate queries that are accurate, efficient, and relevant to the user's intent.

In some implementations, the transformer 612 incorporates a Retrieval-Augmented Generation (RAG) module (combining retrieval and generation components) to access relevant metadata from a knowledge base, which contains embeddings of metadata (vector representations stored in vector databases), including table descriptions, variable definitions, and aggregation rules. The RAG module can use a dense retriever (such as DPR, BERT-based retrievers, or neural retrievers) to identify relevant metadata based on the natural language input and query context, and a generator (such as T5, BART, or GPT-based models) to produce SQL queries based on the retrieved metadata. The transformer 612 combines the strengths of neural networks and symbolic reasoning by leveraging the RAG module to retrieve relevant metadata and applying deterministic logic (rule-based systems, constraint solvers, or logical inference) to rank or filter the retrieved metadata. Specifically, the transformer 612 can use the retrieved metadata to inform the generation of SQL queries, and can apply rules-based logic (business rules, data validation rules, or query optimization rules) to ensure that the generated queries are semantically correct and efficient. This approach enables the transformer 612 to generate accurate and efficient SQL queries while adapting to changing database schemas and querying patterns.

Although a general transformer architecture for a language model and its theory of operation have been described above, this is not intended to be limiting. Existing language models include language models that are based only on the encoder of the transformer (encoder-only models) or only on the decoder of the transformer (decoder-only models). An encoder-only language model encodes the input text sequence into feature vectors that can then be further processed by a task-specific layer (e.g., a classification layer for sentiment analysis or named entity recognition). BERT (Bidirectional Encoder Representations from Transformers) is an example of a language model that can be considered to be an encoder-only language model. A decoder-only language model accepts embeddings as input and can use auto-regression (predicting next tokens based on previous tokens) to generate an output text sequence. Transformer-XL (extended context transformer) and GPT-type models (Generative Pre-trained Transformers) can be language models that are considered to be decoder-only language models.

Because GPT-type language models tend to have a large number of parameters (billions or trillions of parameters), these language models can be considered LLMs. An example of a GPT-type LLM is GPT-3 (with 175 billion parameters). GPT-3 is a type of GPT language model that has been trained (in an unsupervised manner) on a large corpus derived from documents available to the public online (web pages, books, articles, and other text sources). GPT-3 has a very large number of learned parameters (on the order of hundreds of billions), is able to accept a large number of tokens as input (e.g., up to 2,048 input tokens in the original version, with newer models supporting longer contexts), and is able to generate a large number of tokens as output (e.g., up to 2,048 tokens or more in newer versions). GPT-3 has been trained as a generative model, meaning that it can process input text sequences to predictively generate a meaningful output text sequence. ChatGPT (a conversational AI system) is built on top of a GPT-type LLM and has been fine-tuned with training datasets based on text-based chats (e.g., chatbot conversations using reinforcement learning from human feedback). ChatGPT is designed for processing natural language, receiving chat-like inputs, and generating chat-like outputs.

A computer system can access a remote language model (e.g., a cloud-based language model), such as ChatGPT or GPT-3 (or other models such as Claude, Gemini, or LLaMA), via a software interface (e.g., an API such as REST API, GraphQL, or gRPC). Additionally or alternatively, such a remote language model can be accessed via a network such as, for example, the Internet (using HTTP/HTTPS protocols). In some implementations, such as, for example, potentially in the case of a cloud-based language model, a remote language model can be hosted by a computer system that can include a plurality of cooperating (e.g., cooperating via a network) computer systems that can be in, for example, a distributed arrangement (using distributed computing frameworks or cloud infrastructure). Notably, a remote language model can employ a plurality of processors (e.g., hardware processors such as, for example, processors of cooperating computer systems including CPUs, GPUs, or TPUs). Indeed, processing of inputs by an LLM can be computationally expensive/can involve a large number of operations (e.g., many instructions can be executed/large data structures can be accessed from memory requiring significant computational resources), and providing output in a required timeframe (e.g., real time or near real time typically measured in milliseconds or seconds) can require the use of a plurality of processors/cooperating computing devices as discussed above.

Inputs to an LLM can be referred to as a prompt, which is a natural language input that includes instructions to the LLM to generate a desired output (formatted as text strings, structured templates, or JSON objects). A computer system can generate a prompt that is provided as input to the LLM via its API. As described above, the prompt can optionally be processed or pre-processed into a token sequence (using tokenization algorithms such as BPE, WordPiece, or SentencePiece) prior to being provided as input to the LLM via its API. A prompt can include one or more examples of the desired output (demonstration examples or templates), which provides the LLM with additional information to enable the LLM to generate output according to the desired output. Additionally or alternatively, the examples included in a prompt can provide inputs (e.g., example inputs such as sample queries or use cases) corresponding to/as can be expected to result in the desired outputs provided. A one-shot prompt refers to a prompt that includes one example (single demonstration), and a few-shot prompt refers to a prompt that includes multiple examples (typically 2-10 examples). A prompt that includes no examples can be referred to as a zero-shot prompt (relying solely on the model's pre-trained knowledge).

Example Computer System

Figure 7:
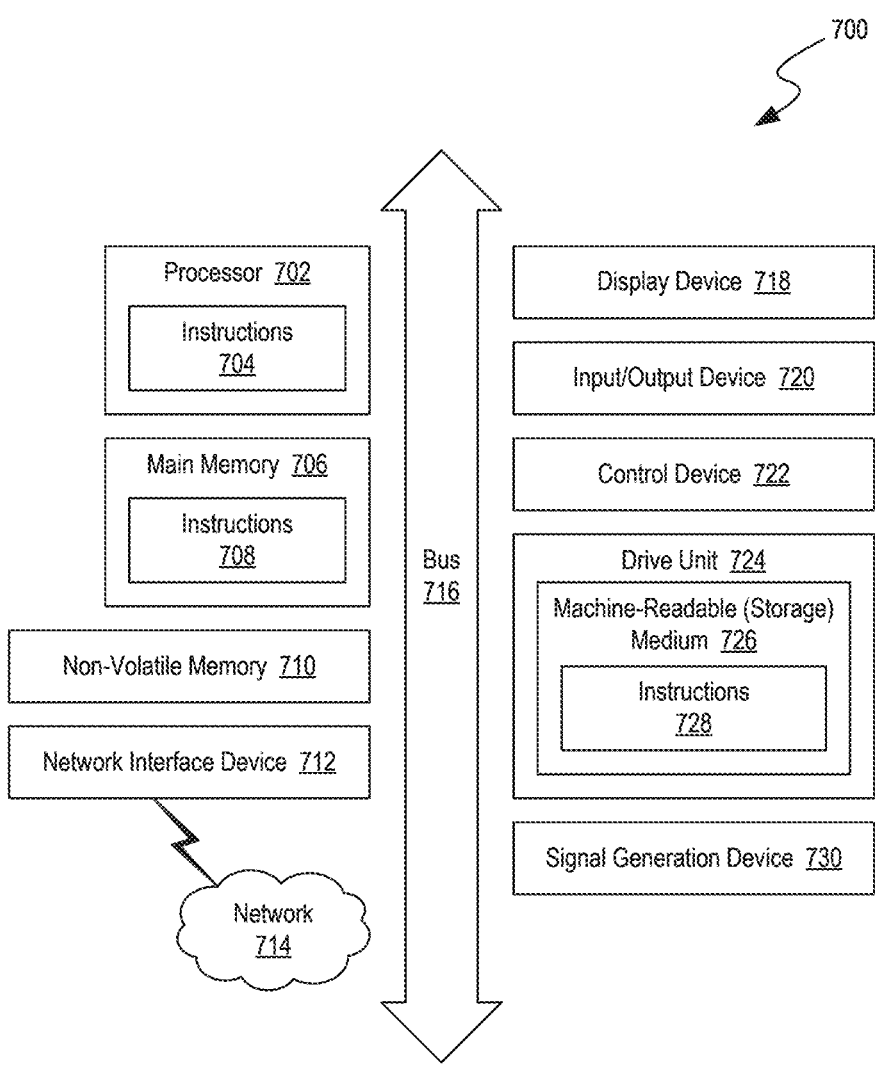
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any specific portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. One or more non-transitory, computer-readable storage media comprising instructions recorded thereon, wherein the instructions, when executed by at least one data processor of a system, cause the system to incrementally train an artificial intelligence model structured to generate personalized code units, the artificial intelligence model comprising a set of memory units and activation functions linking memory units in the set of memory units updatable to improve generated code unit accuracy, the instructions comprising:

receiving a natural language query;

determining a user persona based on contextual information regarding a user associated with the natural language query, the contextual information comprising at least one of: (i) user role information, or (ii) historical interaction pattern information;

responsive to determining that at least a portion of the natural language query matches an ontology entry, accessing a corresponding code unit associated with the ontology entry, wherein the code unit is identified based on the determined user persona;

responsive to determining that at least a portion of the natural language query does not match an ontology entry, applying the artificial intelligence model to generate the code unit by prompting the artificial intelligence model with the at least a portion of the natural language query and at least two of: (i) the user role information, (ii) the historical interaction pattern information, or (iii) the determined user persona;

executing the code unit against a data source to generate a result set; and responsive to detecting a feedback item in connection with the result set or the code unit, incrementally training the artificial intelligence model using the detected feedback item, wherein incrementally training the artificial intelligence model comprises causing the artificial intelligence model to update, responsive to the detected feedback item, the set of memory units and the activation functions linking the memory units in the set of memory units.

2. The one or more non-transitory, computer-readable storage media of claim 1, wherein the code unit comprises one or more of a data selection statement, an entity linking clause, a result set filtering clause, or a result set organization clause.

3. The one or more non-transitory, computer-readable storage media of claim 1, wherein the detected feedback item comprises an upvote or a downvote, the instructions further comprising:

responsive to determining that a number of upvotes relating to the code unit meets or exceeds a predetermined threshold, adding the code unit to the ontology and linking the code unit with the user persona.

4. The one or more non-transitory, computer-readable storage media of claim 1, wherein the instructions further cause the system to prioritize persona-relevant code units by:

performing similarity matching using retrieval-augmented generation to identify a semantic relationship between at least a portion of the natural language query and the ontology entry; and weighting the similarity matching based on the determined user persona.

5. The one or more non-transitory, computer-readable storage media of claim 1, wherein determining the user persona comprises:

using query history associated with the user to generate a prediction regarding one or more of a data domain preference, a visualization type preference, or a query complexity preference of the user;

applying a trained machine learning classification model to the data domain preference, the visualization type preference, or the query complexity preference of the user to generate a classifier; and using the classifier, determining the user persona.

6. The one or more non-transitory, computer-readable storage media of claim 1, the instructions further comprising:

responsive to detecting an additional feedback item comprising a modification to the code unit, updating the ontology entry to store the modification to the code unit.

7. The one or more non-transitory, computer-readable storage media of claim 1, the instructions further comprising:

based on the detected user persona, applying compute logic to the generated result set, the compute logic comprising one or more of a data aggregation operation, a summarization operation, execution of an additional code unit, or applying a highlighting schema to the generated result set.

8. The one or more non-transitory, computer-readable storage media of claim 1, the instructions further comprising:

responsive to detecting an additional feedback item comprising a modification to the code unit, update the ontology entry to store the modification to the code unit.

9. A computer-implemented method to incrementally train an artificial intelligence model structured to generate personalized code units, the artificial intelligence model comprising a set of memory units and activation functions linking memory units in the set of memory units updatable to improve generated code unit accuracy, the method comprising:

receiving a natural language query;

determining a user persona based on contextual information regarding a user associated with the natural language query, the contextual information comprising at least one of: (i) user role information, or (ii) historical interaction pattern information;

responsive to determining that at least a portion of the natural language query matches an ontology entry, accessing a corresponding code unit associated with the ontology entry, wherein the code unit is identified based on the determined user persona;

responsive to determining that at least a portion of the natural language query does not match an ontology entry, applying the artificial intelligence model to generate the code unit by prompting the artificial intelligence model with the at least a portion of the natural language query and at least two of: (i) the user role information, (ii) the historical interaction pattern information, or (iii) the determined user persona;

executing the code unit against a data source to generate a result set; and responsive to detecting a feedback item in connection with the result set or the code unit, incrementally training the artificial intelligence model using the detected feedback item, wherein incrementally training the artificial intelligence model comprises causing the artificial intelligence model to update, responsive to the detected feedback item, the set of memory units and the activation functions linking the memory units in the set of memory units.

10. The computer-implemented method of claim 9, wherein the code unit comprises one or more of a data selection statement, an entity linking clause, a result set filtering clause, or a result set organization clause.

11. The computer-implemented method of claim 9, wherein the detected feedback item comprises an upvote or a downvote, the method further comprising:

responsive to determining that a number of upvotes relating to the code unit meets or exceeds a predetermined threshold, adding the code unit to the ontology and linking the code unit with the user persona.

12. The computer-implemented method of claim 9, the method further comprising prioritizing persona-relevant code units by:

performing similarity matching using retrieval-augmented generation to identify a semantic relationship between at least a portion of the natural language query and the ontology entry; and weighting the similarity matching based on the determined user persona.

13. The computer-implemented method of claim 9, wherein determining the user persona comprises:

using query history associated with the user to generate a prediction regarding one or more of a data domain preference, a visualization type preference, or a query complexity preference of the user;

applying a trained machine learning classification model to the data domain preference, the visualization type preference, or the query complexity preference of the user to generate a classifier; and using the classifier, determining the user persona.

14. The computer-implemented method of claim 9, the method further comprising:

responsive to detecting an additional feedback item comprising a modification to the code unit, updating the ontology entry to store the modification to the code unit.

15. The computer-implemented method of claim 9, the method further comprising:

based on the detected user persona, applying compute logic to the generated result set, the compute logic comprising one or more of a data aggregation operation, a summarization operation, execution of an additional code unit, or applying a highlighting schema to the generated result set.

16. A computing system comprising at least one data processor and at least one memory having instructions recorded thereon, wherein the instructions, when executed by the at least one data processor, cause the computing system to incrementally train an artificial intelligence model structured to generate personalized code units, the artificial intelligence model comprising a set of memory units and activation functions linking memory units in the set of memory units updatable to improve generated code unit accuracy, by performing operations to:

receive a natural language query;

determine a user persona based on contextual information regarding a user associated with the natural language query, the contextual information comprising at least one of: (i) user role information, or (ii) historical interaction pattern information;

responsive to determining that at least a portion of the natural language query matches an ontology entry, access a corresponding code unit associated with the ontology entry, wherein the code unit is identified based on the determined user persona;

responsive to determining that at least a portion of the natural language query does not match an ontology entry, apply the artificial intelligence model to generate the code unit by prompting the artificial intelligence model with the at least a portion of the natural language query and at least two of: (i) the user role information, (ii) the historical interaction pattern information, or (iii) the determined user persona;

execute the code unit against a data source to generate a result set; and responsive to detecting a feedback item in connection with the result set or the code unit, incrementally train the artificial intelligence model using the detected feedback item, wherein incrementally training the artificial intelligence model comprises causing the artificial intelligence model to update, responsive to the detected feedback item, the set of memory units and the activation functions linking the memory units in the set of memory units.

17. The computing system of claim 16, wherein the code unit comprises one or more of a data selection statement, an entity linking clause, a result set filtering clause, or a result set organization clause.

18. The computing system of claim 16, wherein the detected feedback item comprises an upvote or a downvote, the operations further comprising:

responsive to determining that a number of upvotes relating to the code unit meets or exceeds a predetermined threshold, add the code unit to the ontology and linking the code unit with the user persona.

19. The computing system of claim 16, wherein the operations further comprise causing the computing system to prioritize persona-relevant code units, comprising:

perform similarity matching using retrieval-augmented generation to identify a semantic relationship between at least a portion of the natural language query and the ontology entry; and weight the similarity matching based on the determined user persona.

20. The computing system of claim 16, wherein determining the user persona comprises operations to:

use query history associated with the user to generate a prediction regarding one or more of a data domain preference, a visualization type preference, or a query complexity preference of the user;

apply a trained machine learning classification model to the data domain preference, the visualization type preference, or the query complexity preference of the user to generate a classifier; and using the classifier, determine the user persona.

\* \* \* \* \*